(12) United States Patent
Harada et al.

(10) Patent No.: US 11,540,335 B2
(45) Date of Patent: Dec. 27, 2022

(54) TERMINAL, BASE STATION, RADIO COMMUNICATION METHOD, AND SYSTEM

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Yu Jiang, Beijing (CN); Lihui Wang, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/145,916

(22) Filed: Jan. 11, 2021

(65) Prior Publication Data
US 2021/0136816 A1    May 6, 2021

Related U.S. Application Data

(63) Continuation of application No. 16/099,607, filed as application No. PCT/JP2017/017783 on May 11, 2017, now abandoned.

(30) Foreign Application Priority Data

May 12, 2016   (JP) .............................. JP2016-096553

(51) Int. Cl.
*H04W 74/08* (2009.01)
*H04W 72/14* (2009.01)
*H04W 72/04* (2009.01)

(52) U.S. Cl.
CPC ..... *H04W 74/085* (2013.01); *H04W 72/0446* (2013.01); *H04W 72/14* (2013.01); *H04W 74/0808* (2013.01)

(58) Field of Classification Search
CPC ........... H04W 74/085; H04W 74/0808; H04W 72/14; H04W 72/0446
See application file for complete search history.

(56) References Cited

U.S. PATENT DOCUMENTS

| | | |
|---|---|---|
| 2017/0048880 A1 | 2/2017 | Anderson et al. |
| 2017/0325258 A1 | 11/2017 | Nogami et al. |
| 2018/0115983 A1 | 4/2018 | Harada et al. |

(Continued)

FOREIGN PATENT DOCUMENTS

WO     2016072218 A1    5/2016

OTHER PUBLICATIONS

AT&T; "Drivers, Benefits and Challenges for LTE in Unlicensed Spectrum"; 3GPP TSG-RAN Meeting #62 RP-131701; Busan, Korea; Dec. 3-6, 2013 (3 pages).

(Continued)

*Primary Examiner* — Jianye Wu
(74) *Attorney, Agent, or Firm* — Osha Bergman Watanabe & Burton LLP

(57) ABSTRACT

A terminal is disclosed including a receiver that receives first downlink control information (DCI) indicating SRS transmission and second DCI indicating a listening condition for PUSCH transmission and a processor that, when contiguous transmissions of the SRS transmission and the PUSCH transmission are scheduled, changes the listening condition for following PUSCH transmission based on a listening result for the SRS transmission. In other aspects, a base station, a radio communication method, and a system are also disclosed.

5 Claims, 21 Drawing Sheets

(56) References Cited

U.S. PATENT DOCUMENTS

2019/0053222 A1 2/2019 Bhorkar et al.
2020/0404688 A1* 12/2020 Park .................. H04W 72/1268

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
International Search Report issued in PCT/JP2017/017783, dated Jun. 20, 2017 (4 pages).
Written Opinion issued in PCT/JP2017/017783, dated Jun. 20, 2017 (10 pages).
Extended European Search Report issued in the counterpart European Patent Application No. 17796211.5, dated Feb. 19, 2019 (10 pages).
Ericsson; "On Signalling of UL Channel Access Parameters"; 3GPP TSG RAN WG1 Meeting #84bis R1-163152; Busan, Korea, Apr. 11-15, 2016 (6 pages).
Sharp; "Uplink subframe structure in LAA carrier"; 3GPP TSG RAN WG1 Meeting #84bis R1-162838; Busan, Korea, Apr. 11-15, 2016 (5 pages).
Office Action issued in the counterpart European Patent Application No. 17796211.5, dated Feb. 3, 2020 (5 pages).
Office Action issued in Chinese Application No. 201780029323.5 dated Sep. 18, 2021 (13 pages).

* cited by examiner

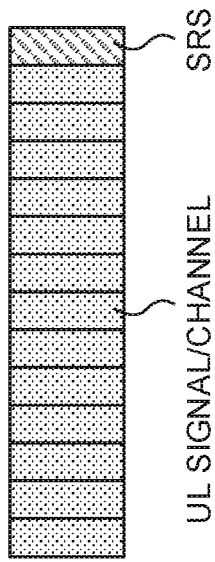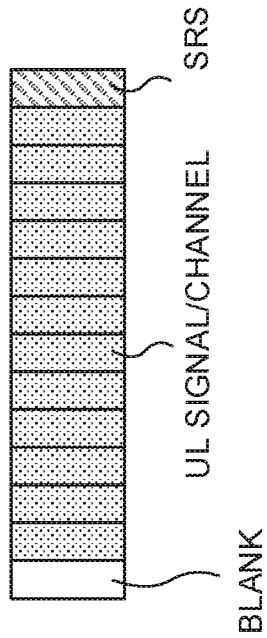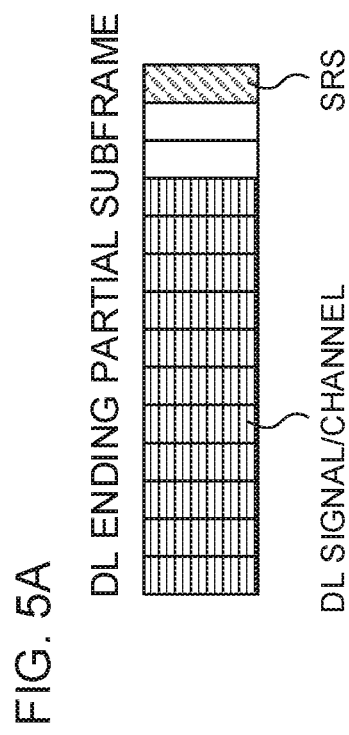

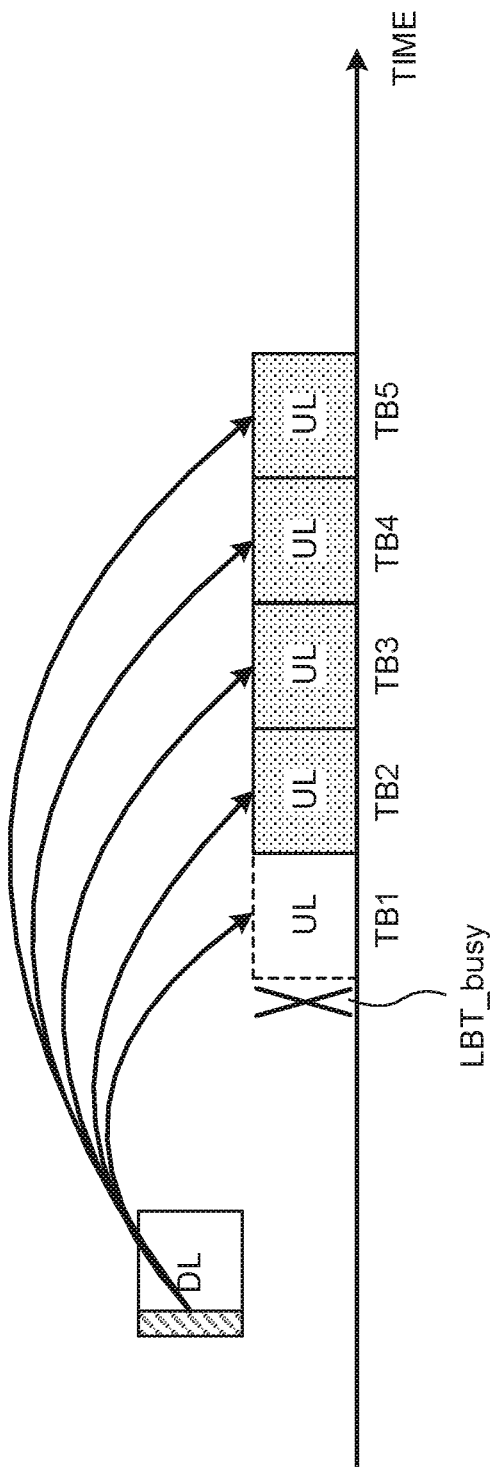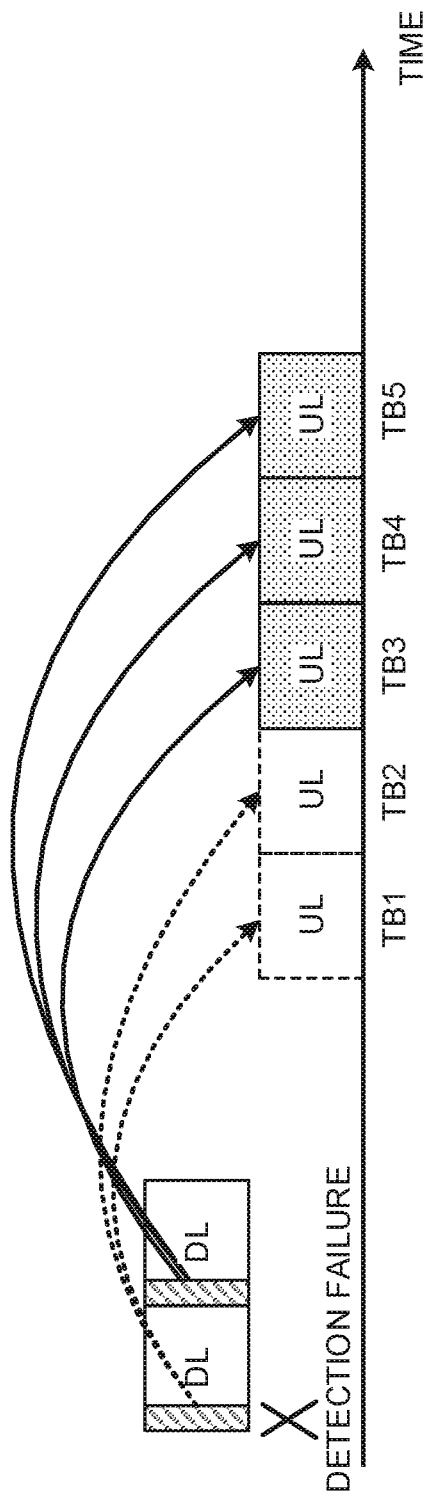

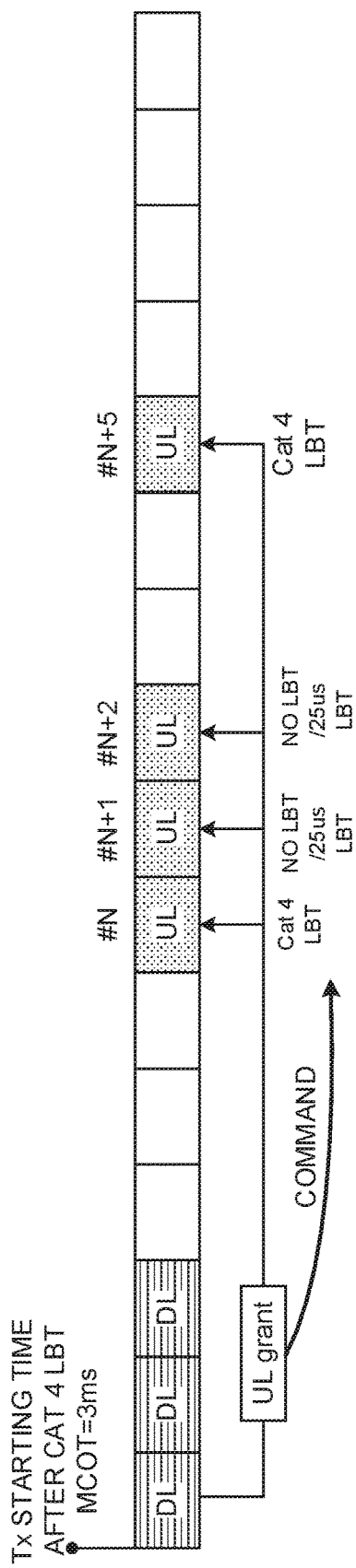
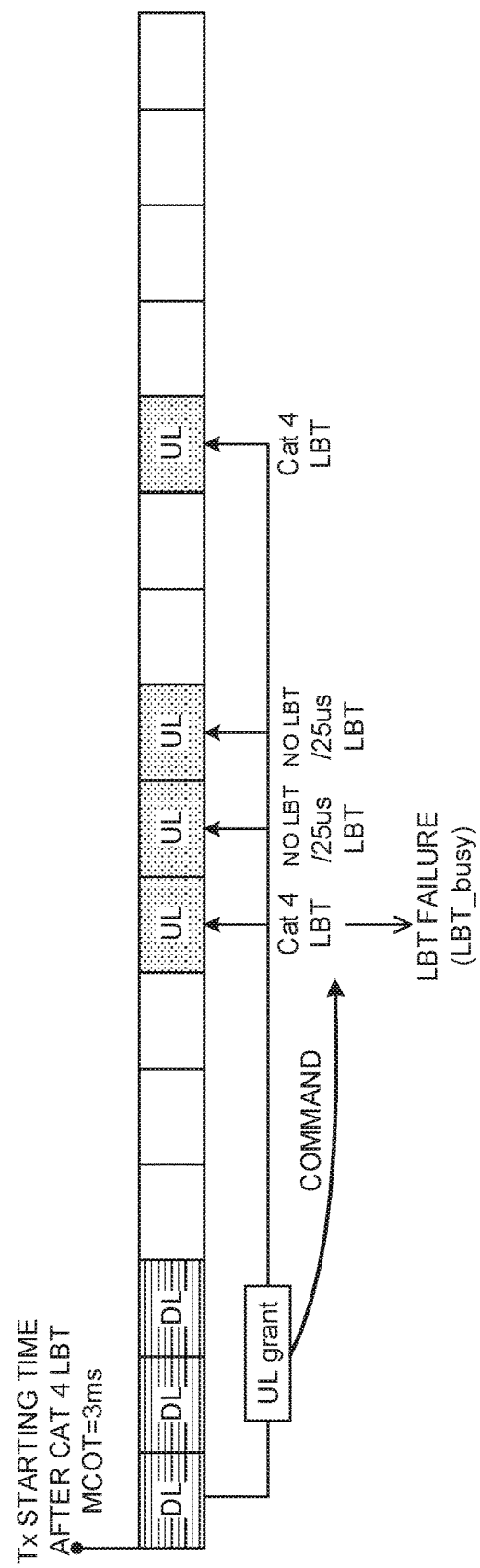

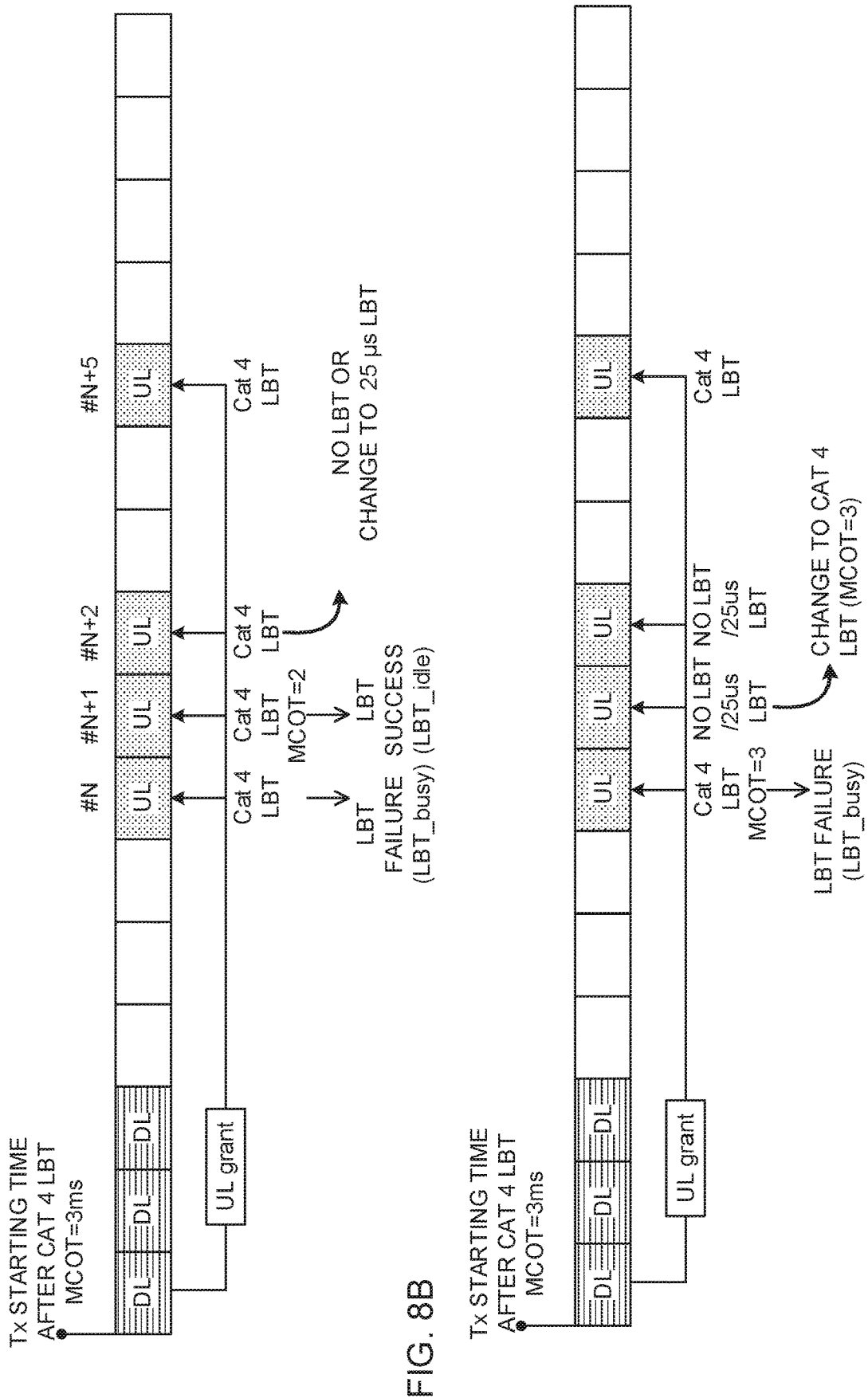

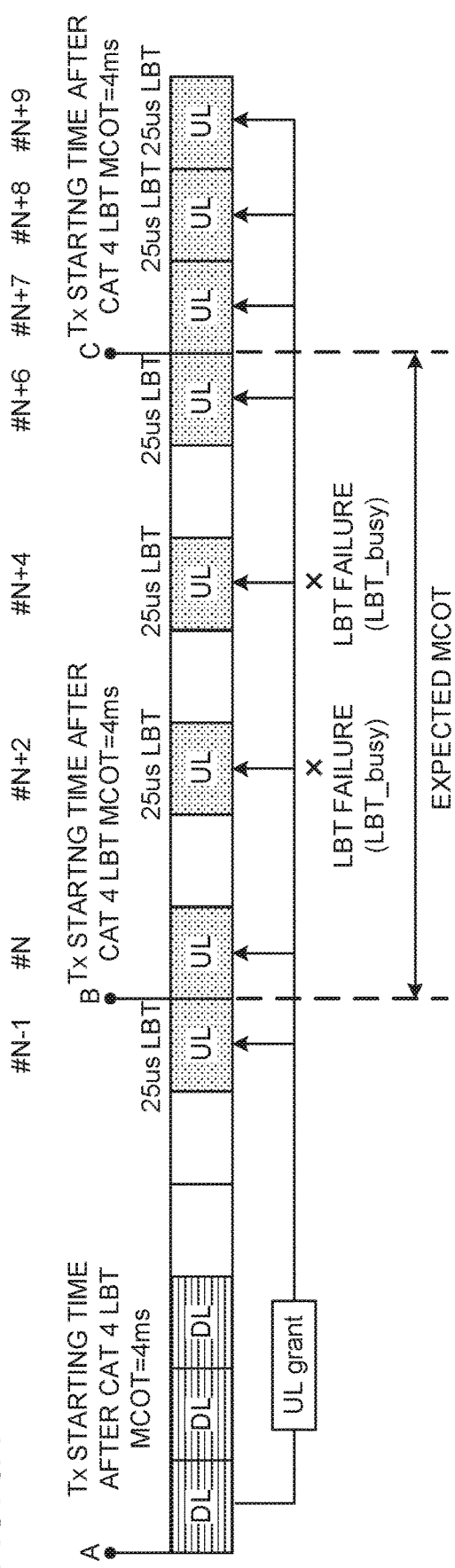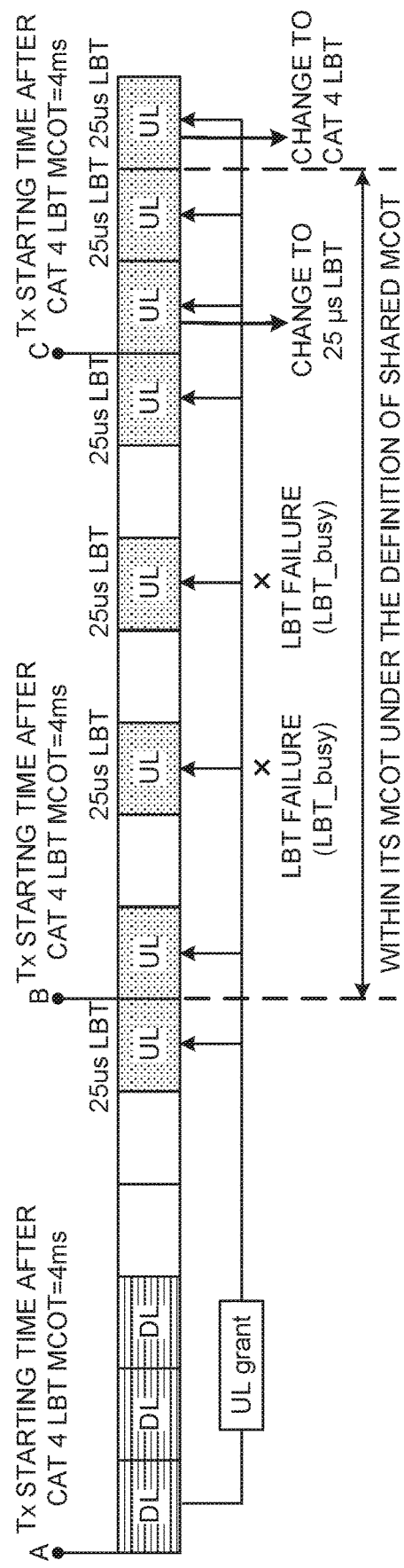

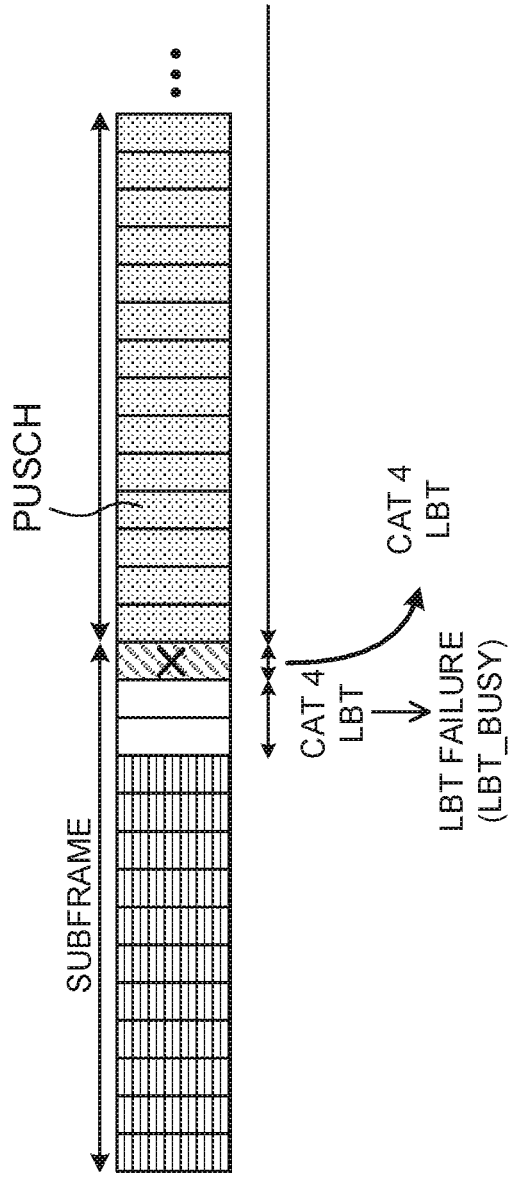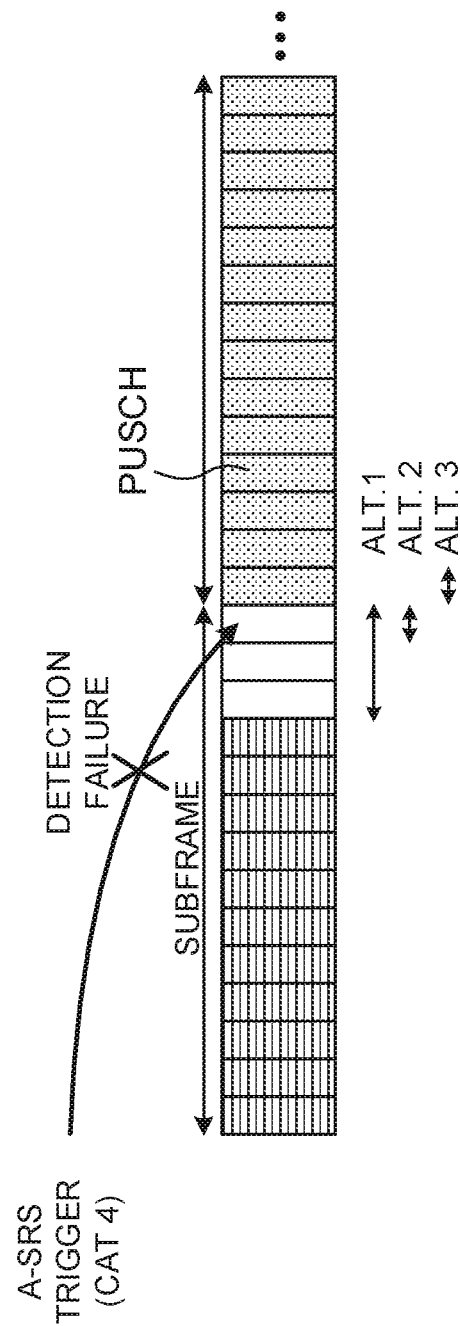
FIG. 14A
FIG. 14B

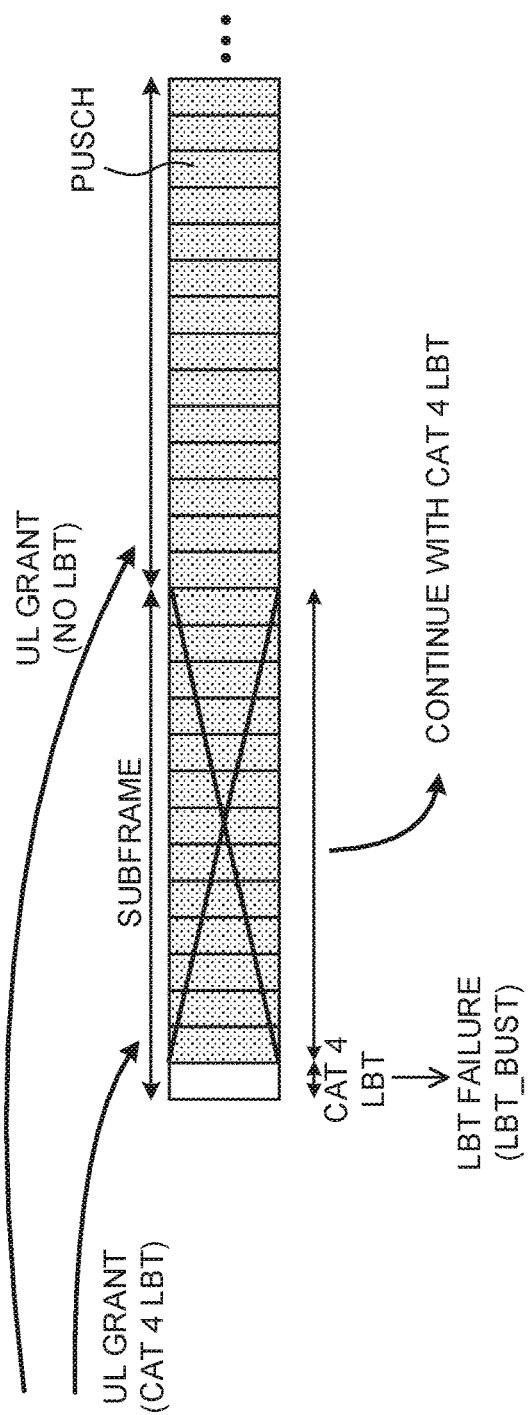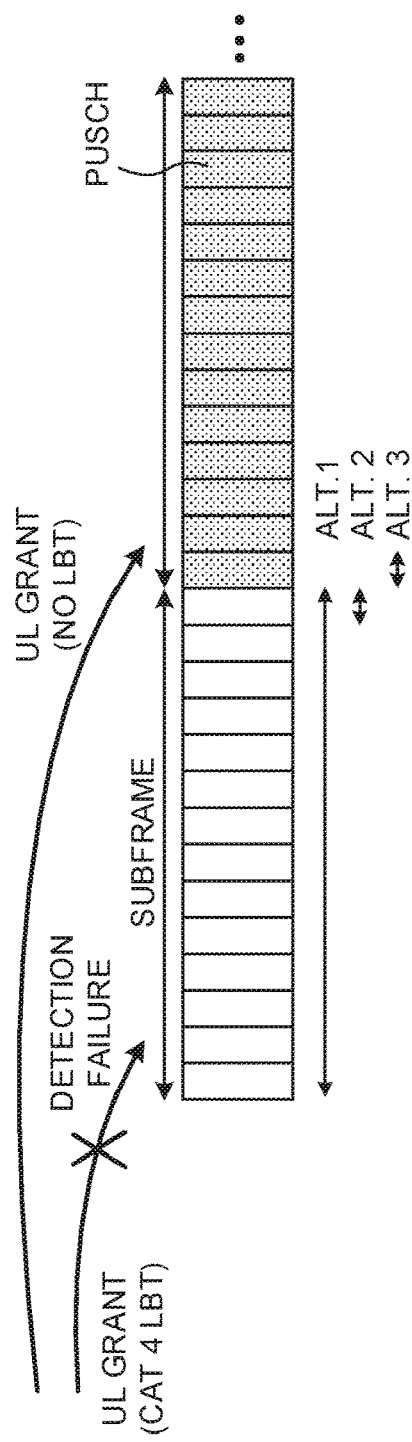
FIG. 15A
FIG. 15B

TERMINAL, BASE STATION, RADIO COMMUNICATION METHOD, AND SYSTEM

CROSS-REFERENCE TO RELATED APPLICATIONS

This application is a continuation application of U.S. patent application Ser. No. 16/099,607, filed on Nov. 7, 2018, which is a national phase application of PCT/JP2017/017783, filed on May 11, 2017, which claims priority to Japanese Patent Application No. 2016/096553, filed on May 12, 2016. The contents of these applications are hereby incorporated by reference in their entirety.

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Furthermore, the specifications of LTE-advanced (Rel. 10 to 12) have been drafted for the purpose of achieving further broadbandization and higher speeds beyond LTE, and, in addition, for example, a successor system of LTE—referred to as "5G" (5th generation mobile communication system)—is under study.

The specifications of LTE of Rel. 8 to 12 have been drafted assuming exclusive operations in frequency bands that are licensed to communications providers (operators) (also referred to as "licensed CCs" (or "licensed bands")). As licensed CCs, for example, 800 MHz, 1.7 GHz and 2 GHz are used.

In recent years, user traffic has been increasing steeply following the spread of high-performance user terminals (UE: User Equipment) such as smart-phones and tablets. Although more frequency bands need to be added to accommodate this increasing user traffic, licensed CCs have limited spectra (licensed spectra).

Consequently, a study is in progress with Rel. 13 LTE to enhance the frequencies of LTE systems by using bands of unlicensed spectra (also referred to as "unlicensed CCs" (or "unlicensed bands")) that are available for use apart from licensed CCs (see non-patent literature 2). For unlicensed CCs, for example, the 2.4 GHz band and the 5 GHz band, where Wi-Fi (registered trademark) and Bluetooth (registered trademark) can be used, are under study for use.

To be more specific, Rel. 13 LTE is presently under study to apply carrier aggregation (CA) between licensed CCs and unlicensed CCs. In this way, communication that is performed by using unlicensed CCs together with licensed CCs is referred to as "LAA" (License-Assisted Access). Note that, in the future, dual connectivity (DC) between licensed CCs and unlicensed CCs and stand-alone (SA) of unlicensed CCs may become the subject of study under LAA.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

Non-Patent Literature 2: AT&T, Drivers, Benefits and Challenges for LTE in Unlicensed Spectrum, 3GPP TSG-RAN Meeting #62 RP-131701

SUMMARY OF INVENTION

Technical Problem

For unlicensed CCs, a study is in progress to introduce interference control functionality in order to allow co-presence with other operators' LTE, Wi-Fi and/or other systems. In Wi-Fi, LBT (Listen Before Talk), which is based on CCA (Clear Channel Assessment), is used as an interference control function for use within the same frequency.

Consequently, even when unlicensed CCs are configured in LTE systems, UL transmission and/or DL transmission may be controlled by applying "listening" (for example, LBT) as an interference control function. In this case, efficient and fair co-presence with other systems and other operators is required. Listening that is performed prior to transmission is also referred to as "channel access procedures."

In the event transmission is controlled by applying listening, whether or not to perform transmission and/or the timing of transmission are changed based on the result of listening that is performed before the transmission is carried out. Also, when a user terminal makes UL transmission, it may occur that the radio base station to command this UL transmission designates the conditions of the listening which the user terminal performs before the UL transmission. In this case, the radio base station may control UL listening by reporting the conditions and/or the timing of listening to apply before each UL transmission, taking into account how many times UL transmissions is commanded to the user terminal (for example, the number of UL subframes in which UL transmission is commanded) and so on.

However, depending on the result of listening for UL transmission in the user terminal, UL transmission cannot be performed, and there is a possibility that the conditions and/or the timing of listening before each UL transmission that have been designated for the user terminal are no longer appropriate. This may result in the situation where the quality of communication deteriorates and/or fairness with other systems or other operators cannot be maintained.

The present invention has been made in view of the above, and it is therefore an object of the present invention to provide a user terminal and a radio communication method that can prevent degradation of communication quality and/or maintain fairness with other systems or other operators in a communication system in which cells that are specified to employ listening are used.

Solution to Problem

According to one aspect of the present invention, a user terminal has a receiving section that receives a DL signal including a UL grant, and a control section that controls transmission of UL data based on the UL grant and a channel access procedure before UL transmission, and, in this user terminal, when a plurality of consecutive UL subframes are scheduled, the control section determines an LBT condition to apply to transmission in a current UL subframe based on a result of LBT in an earlier UL subframe.

Advantageous Effects of Invention

According to the present invention, it is possible to prevent degradation of communication quality and/or main-

BRIEF DESCRIPTION OF DRAWINGS

FIG. 5A, FIG. 5B, and FIG. 5C are diagrams to show configurations of DL ending partial subframes in which an SRS is triggered, and PUSCHs;

FIG. 6A and FIG. 6B are diagrams to show examples of operations that take place when LBT fails and when UL grant detection fails;

FIG. 7A and FIG. 7B are conceptual diagrams to explain the problems with not changing the conditions of listening;

FIG. 8A and FIG. 8B are diagrams to show examples of operations for changing the conditions of listening when the result of UL listening indicates "idle";

FIG. 9A and FIG. 9B are conceptual diagrams to explain the problems with not changing the conditions of listening in non-consecutive subframes;

FIG. 14A and FIG. 14B are diagrams to show how to cope when LBT for the SRS fails and when SRS trigger detection fails;

FIG. 15A and FIG. 15B are diagrams to show how to cope when LBT for the PUSCH fails and when UL grant detection fails;

DESCRIPTION OF EMBODIMENTS

Figure 1A:
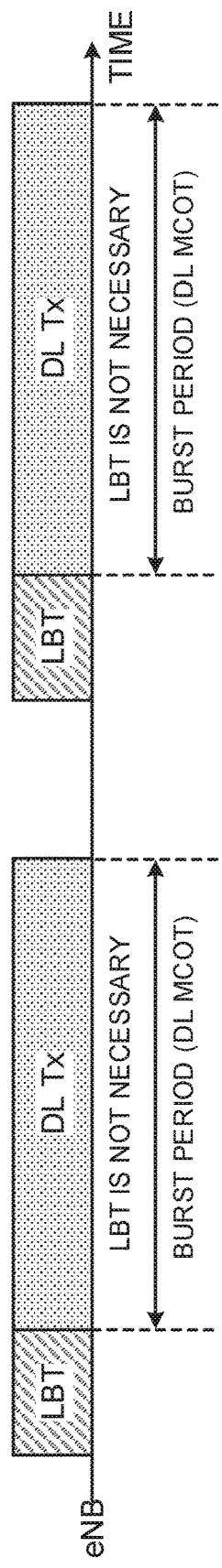
FIG. 1A and FIG. 1B are diagrams to show examples of communication methods using channel access procedures.

In systems that run LTE/LTE-A in unlicensed CCs (for example, LAA systems), interference control functionality is likely to be necessary in order to allow co-presence with other operators' LTE, Wi-Fi and/or other systems. In this case, efficient and fair co-presence with other systems and other operators is required. Note that systems that run LTE/LTE-A in unlicensed CCs may be collectively referred to as "LAA," "LAA-LTE," "LTE-U," "U-LTE" and so on, regardless of whether the mode of operation is CA, DC or SA.

Generally speaking, when a transmission point (for example, a radio base station (eNB), a user terminal (UE) and so on) that communicates by using a carrier (which may also be referred to as a "carrier frequency," or simply a "frequency") of an unlicensed CC detects another entity (for example, another user terminal) that is communicating using this unlicensed CC's carrier, the transmission point is disallowed to make transmission in this carrier.

Therefore, the transmission point performs "listening" (LBT: Listen Before Talk) at a timing a predetermined period before a transmission timing. To be more specific, by executing LBT, the transmission point searches the whole of the target carrier band (for example, one component carrier (CC)) at a timing that is a predetermined period before a transmission timing, and checks whether or not there are other pieces of apparatus (for example, radio base stations, user terminals, Wi-Fi apparatus and so on) communicating in this carrier band.

Note that "listening" refers to the operation which a given transmission point (for example, a radio base station, a user terminal and so on) performs before transmitting signals in order to check whether or not signals to exceed a predetermined level (for example, predetermined power) are being transmitted from other transmission points. Furthermore, listening that is performed by radio base stations and/or user terminals may be referred to as "channel access procedures," "LBT," "CCA" (Clear Channel Assessment), "carrier sensing" and so on.

The transmission point then carries out transmission using this carrier only if it is confirmed that no other apparatus is communicating. If the received power measured during LBT (the received signal power during listening period) is equal to or lower than a predetermined threshold, the transmission point judges that the channel is in the idle state (LBT) and carries out transmission. When a "channel is in the idle state," this means that, in other words, the channel is not occupied by a specific system, and it is equally possible to say that a channel is "idle," a channel is "clear," a channel is "free," and so on.

On the other hand, if only just a portion of the target carrier band is detected to be used by another piece of apparatus, the transmission point stops its transmission. For example, if the transmission point detects that the received power of a signal from another piece of apparatus in this band exceeds a predetermined threshold, the transmission point judges the channel is in the busy state ($LBT_{busy}$), and makes no transmission. In the event $LBT_{busy}$ is yielded, LBT is carried out again with respect to this channel, and the channel becomes available for use only after the idle state is confirmed. Note that the method of judging whether a channel is in the idle state/busy state based on LBT is by no means limited to this.

Figure 1B:
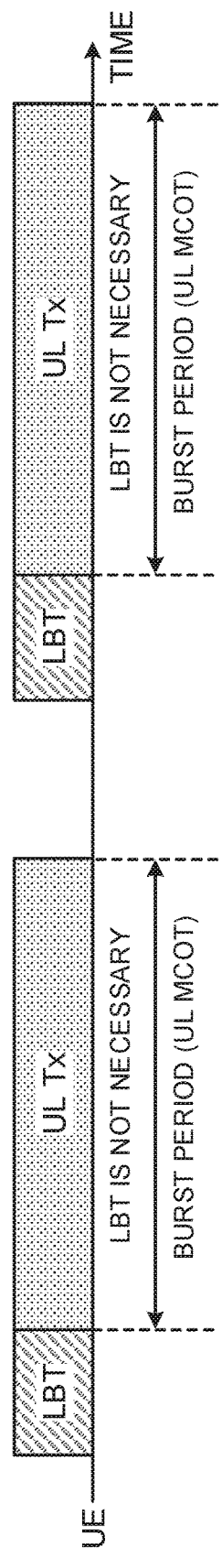

FIGS. 1A and 1B show examples of communication methods using channel access procedures. FIG. 1A shows DL communication, and FIG. 1B shows UL communication.

In DL communication, when the result of listening (DL-LBT) performed by a radio base station before DL transmission indicates "LBT-idle," a period during which DL transmission to skip LBT (DL burst transmission) is allowed can be configured (FIG. 1A). The period during which transmission is allowed without performing LBT after listening (in the event of LBT-idle) is also referred to as "DL maximum channel occupancy time" (DL MCOT), "channel occupancy time," "burst period" (burst transmission period, burst length, maximum burst length, maximum possible burst length, etc.) and so on.

In UL communication, when the result of listening (UL-LBT) performed by a user terminal before UL transmission indicates "LBT-idle," a period during which UL transmission to skip LBT (UL burst transmission) is allowed can be configured (FIG. 1B). The period during which transmission is permitted without performing LBT after listening (in the event of LBT-idle) is also referred to as "UL maximum channel occupancy time" (UL MCOT), "channel occupancy time," "burst period" (burst transmission period, burst length, maximum burst length, maximum possible burst length, etc.) and so on.

As described above, by introducing interference control that is based on LBT mechanism in LAA systems, it becomes possible to prevent interference between LAA and Wi-Fi, interference between LAA systems and so on. Furthermore, even when transmission points are controlled independently per operator that runs an LAA system, LBT makes it possible to reduce interference without learning the details of each operator's control.

Meanwhile, when the LBT mechanism is introduced in LAA systems, fair co-presence with other systems (for example, Wi-Fi) and other LTE operators is required.

For the purpose of ensuring fair co-presence with other systems and other operators, it may be possible to apply random backoff to listening even when LTE/LTE-A systems are used in unlicensed CCs. Random backoff refers to the mechanism by which, even when a channel enters the idle state, each transmission point does not start transmission immediately, but defers transmission for a randomly configured period of time (counter value), and starts transmission when the channel is clear.

For example, if a channel is in a busy state in an unlicensed CC, each transmission point (access point) starts transmitting data when the channel is judged to be in the idle state by means of listening. In this case, if multiple transmission points waiting for the channel to enter the idle state start transmitting simultaneously, there is a high possibility that collisions will occur between the transmission points. Therefore, for the purpose of preventing collisions between transmission points, even when the channel enters the idle state, each transmission point does not transmit immediately and defers transmission for a randomly configured period, thereby reducing the possibility of collisions between the transmission points (random backoff).

Such an LBT mechanism with random backoff is also referred to as "category 4." On the other hand, the LBT mechanism without random backoff is also referred to as "category 2." Category 2 is an LBT mechanism to permit transmission immediately after a predetermined period of time (also referred to as "defer duration" (D_eCCA)), and is also referred to as "25 µs LBT."

The backoff period that is configured in each transmission point can be determined based on a counter value that is configured on a random basis (random value). The range of counter values is determined based on the contention window (CW) size, and, for example, the counter value for random backoff is configured randomly out of the range from 1 to the CW size (integer value).

Figure 2:
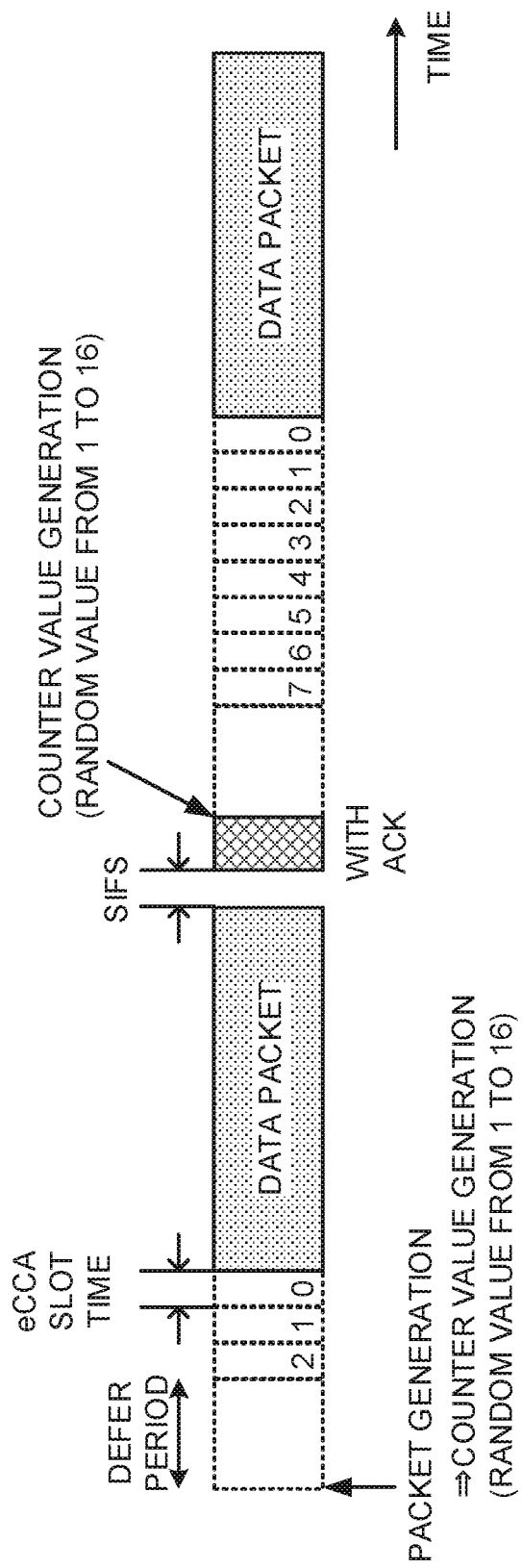
FIG. 2 is a diagram to show an example of applying random backoff.

FIG. 2 shows an example of applying random backoff. A transmission point generates a counter value for random backoff when a channel is judged to be in the idle state based on CCA. Then, the counter value is held until it can be confirmed that the channel has been idle for a predetermined period of waiting time (also referred to as "defer period" (D_eCCA)). When it is successfully confirmed that the channel has been idle for a predetermined period of time, the transmission point performs sensing in a predetermined time unit (for example, an eCCA slot time unit), and the transmission point can lower the counter value if the channel is idle and perform transmission when the counter value becomes zero.

In random backoff, the counter value is determined from a range that is associated with the CW size. FIG. 2 shows a case where random values are selected, from among 1 to 16, as the backoff period. In this way, by controlling transmission based on the counter values for random backoff in listening, it is possible to distribute the opportunities for transmission among a plurality of transmission points and guarantee fairness.

Even when LTE systems are used in unlicensed CCs, it may be possible to apply random backoff to the listening that is performed by transmission points (radio base stations and/or user terminals) before UL transmission and/or DL transmission, as in Wi-Fi.

Figure 3:
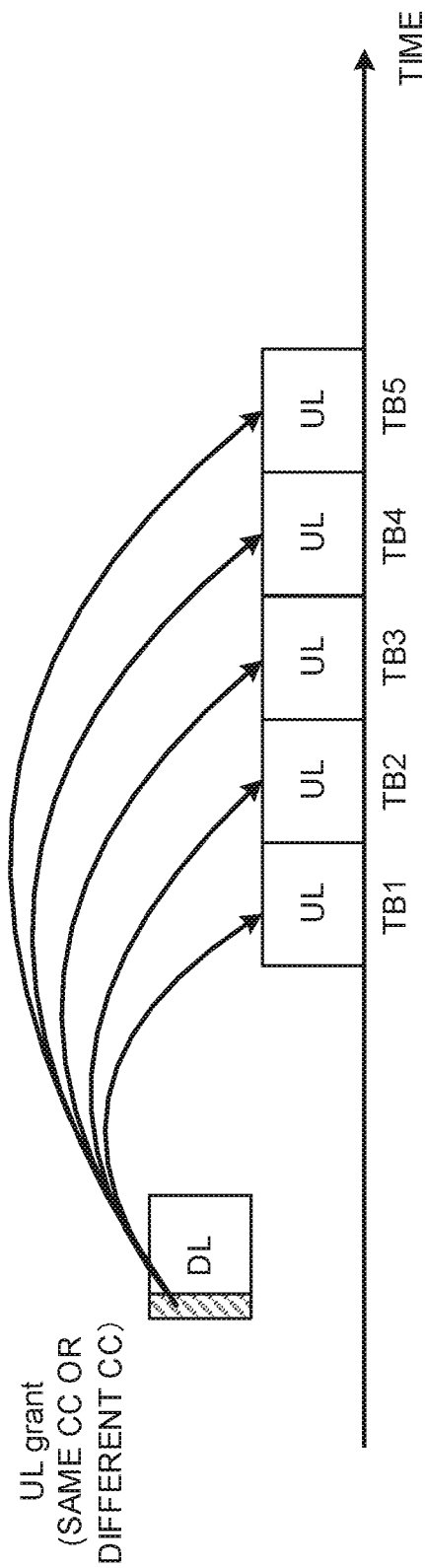
FIG. 3 is a conceptual diagram of a state in which multiple subframes are scheduled by a UL grant.

Now, in eLAA, it may occur that UL communication supports multi-subframe scheduling. FIG. 3 shows how multiple consecutive subframes are scheduled with one piece of downlink control information (for example, a UL grant) that is sent in DL communication. In the case illustrated here, different transport blocks (TBs) are commanded to be transmitted in each subframe. By this means, opportunities for UL transmission can be increased with one UL grant, so that it is possible to reduce the influence that one UL listening result (for example, busy) has on UL transmission.

Figure 4A:
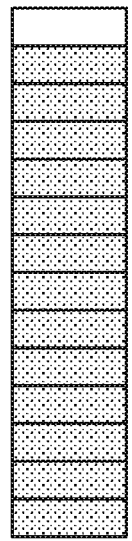
FIG. 4A, FIG. 4B, FIG. 4C, and FIG. 4D are diagrams to show 4 types of PUSCH configurations.
Figure 4B:
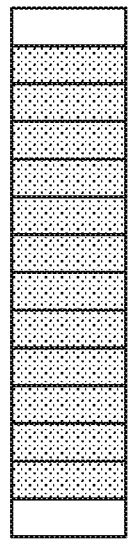
Figure 4C:
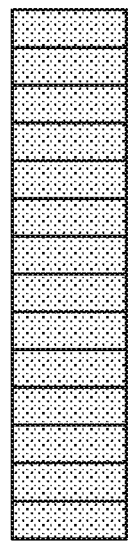
Figure 4D:
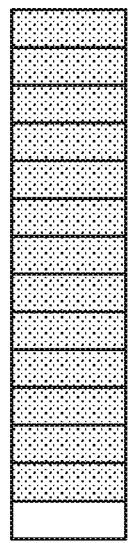

In addition, considering listening, PUSCH configurations, in which the starting symbol and/or the last symbol of a subframe are blank, are under study. To be more specific, the 4 types of PUSCH configurations (configuration 1 to configuration 4) shown in FIGS. 4A, 4B, 4C, and 4D are made possible. PUSCH configuration 1 shown in FIG. 4A is a configuration without blanks, PUSCH configuration 2 shown in FIG. 4B is a configuration in which only the last symbol is blank, PUSCH configuration 3 shown in FIG. 4C is a configuration in which only the starting symbol is blank, and PUSCH configuration 4 shown in FIG. 4D is a configuration in which the starting symbol and the last symbol are blank.

Also, as shown in FIGS. 5A, 5B, and 5C, a study is in progress to provide support for sending the SRS (Sounding Reference Signal) in DL subframes (DL ending partial subframes), in which DL signals are not allocated in the second half (at least the last symbol) of the subframes (see FIG. 5A). Also, in the event the SRS is communicated in UL subframes, a study is in progress to transmit the SRS in the last symbol in subframes (see FIGS. 5B and 5C).

In the example shown in FIG. 5A, since the last 3 symbols in the DL ending partial subframe are blank, the SRS can be mapped to the last symbol and transmitted. Also, in the PUSCH configurations of FIG. 4B and FIG. 4C, since the last symbol is blank, the SRS can be mapped to the last symbol and transmitted (see FIGS. 5B and 5C).

Now, as shown in the example of FIG. 3, when a radio base station schedules multiple consecutive subframes for UL transmission for a user terminal with a UL grant, the radio base station may designate the conditions of the listening which the user terminal performs before making the UL transmission. In this case, it may occur that the radio base station controls the UL listening by reporting the conditions and/or the timing of the listening before each UL transmission, taking into account the number of times the user terminal is commanded UL transmission (for example, the number of UL subframes in which UL transmission is commanded), and so on.

For example, the radio base station may configure different listening conditions for UL transmission in multiple UL subframes. For example, more stringent UL listening conditions (for example, category 4) may be configured for UL transmission in a subframe to be transmitted earlier in the time direction (for example, the first subframe), and UL listening conditions (for example, category 2) to make UL transmission easier may be configured for UL transmission in subsequent UL subframes.

However, depending on the result of listening for UL transmission in the user terminal, UL transmission cannot be performed, and there is a possibility that the conditions and/or the timing of listening before each UL transmission that have been designated for the user terminal are no longer appropriate. For example, assume that, as shown in FIG. 6A, the UL listening result in the first subframe indicates "busy" (UL LBT failure). In this case, in the next subframe, listening is performed based on UL listening conditions (for example, category 2) that have been designated earlier from the radio base station. As a result of this, cases might occur where degradation of communication quality cannot be prevented and/or fairness with other systems or other operators cannot be maintained.

It is also possible to schedule multiple consecutive subframes by separating them into the first half and the second half using two UL grants, and apply different UL listening conditions between the consecutive subframes of the first half and the consecutive subframes of the second half. At this time, if, as shown in FIG. 6B, a UL grant fails to be detected in the consecutive subframes of the first half, listening and UL communication are not performed in the first-half two subframes. However, the listening conditions (for example, category 2) designated for the three subframes of the second half fall under a category that is designated on the premise that listening is performed in a predetermined category (for example, category 4) in the first-half two subframes. Therefore, if the user terminal fails to detect the first UL grant, the listening conditions (for example, category 2) that are designated for the three subframes of the second half may not be necessarily adequate.

Then, the present inventors have focused on the fact that, depending on the result of UL listening for UL transmission in a predetermined UL subframe, the UL listening conditions and/or the UL listening timing for UL transmission in the next UL subframe may be judged inadequate, and found out using the result of UL listening in an earlier subframe to decide the conditions of UL listening and/or the timing of UL listening in the next subframe.

In the following description, "conditions of listening" refers to the types of listening (LBT types), which are classified depending on at least whether or not random backoff is applied (for example, category 2 and category 4). Also, in addition to categories, priority classes, which are configured per category (per LBT type), the types of UL traffic, and combinations of these, may be used as listening conditions as well.

First Embodiment

First, problems with using the listening conditions for the current subframe that have been designated earlier, without taking into consideration the result of listening in the previous subframe, will be described in detail with reference to FIG. 7A and FIG. 7B.

FIG. 7A shows a state in which the listening conditions for a plurality of UL subframes are designated from a base station to a user terminal in one UL grant. By the UL grant, category 4 is designated as a condition of listening for UL subframe #N, category 2 (25 µs LBT) or "no listening" is designated as a listening condition for UL subframes #N+1 and #N+2, and category 4 is designated as a listening condition for UL subframe #N+5.

In the situation where listening conditions are designated in this way, assume that the listening result in first UL subframe #N indicates "busy," as shown in FIG. 7B. If the user terminal uses category 2 (25 µs LBT) or "no listening" as a listening condition for UL subframe #N+1, a situation that is not fair to other user terminals, systems and so on occurs.

That is, while category 4 to require random backoff is applied as a listening condition for UL subframe #N, category 2, which increases the possibility of acquiring transmission opportunities, is designated for succeeding UL subframes #N+1 and #N+2, raising the problem that category 2 can be applied without executing random backoff. In addition, when UL transmission in UL subframe #N+1 is performed without UL listening, not only a situation that is not fair to other user terminals and systems occurs, but also collisions with other terminals might occur.

Also, if the user terminal stops transmitting subsequent UL subframes because the listening result in first UL subframe #N was "busy," the problem that the opportunities for transmission in UL communication are significantly reduced arises.

Therefore, according to the first embodiment, the user terminal judges the listening conditions to apply to transmission in the current subframe based on the result of listening in the previous subframe. For example, when scheduling consecutive UL subframes, the radio base station designates common conditions (for example, the same category) for each UL subframe as conditions of UL listening, in a UL grant. When the result of UL listening in an earlier subframe among the consecutive UL subframes indicates "idle" (LBT succeeds), the user terminal changes the listening conditions in the current UL subframe.

With reference to FIG. 8A, a specific example will be described in which listening conditions are changed when the result of UL listening in an earlier subframe indicates "idle." A plurality of UL subframes #N, N+1, N+2, N+3 and N+5 are scheduled in the UL for a user terminal, by the base station. UL subframes #N, N+1, N+2 and N+3 are consecutive subframes. Category 4 is designated as a listening condition for each of UL subframes #N, N+1, N+2, N+3 and N+5 in one UL grant.

Assume that, in the user terminal, the result of listening in first UL subframe #N indicates "busy" and the result of listening in next UL subframe #N+1 indicates "idle." In this case, if the current UL subframe to apply LBT to is #N+2, given that the result of listening in previous UL subframe #N+1 was "idle," the listening condition for current UL subframe #N+2 is changed from category 4 to category 2 (25 µs LBT).

If the listening conditions for the current UL subframe are changed because the result of listening in the previous UL subframe was "idle," the rule of change can be configured on an arbitrary basis. For example, if the rules of change are provided in the standard, it is possible to adopt rules of change that are in conformity with the provision. Also, the rules of change may be reported from the base station to the user terminal in advance.

To be more specific, if category 2 is designated as a condition of listening in a UL grant, a change is made to "no listening," and, if category 4 is designated, a change is made to category 2. The listening conditions after the change can be seen as listening conditions with a smaller transmission defer period than the listening conditions before the change.

In the above example, the base station designates conditions that are common to each UL subframe (for example, the same category) as UL listening conditions, in a UL grant. In this case, if category 4 (with random backoff) is designated in the UL grant, the category may be common, but other conditions (for example, random backoff and so on) may designated individual values, on a per UL subframe basis.

Also, when consecutive UL subframes are scheduled, the base station may designate, in a UL grant, individual conditions, as UL listening conditions, in each UL subframe (for example, different categories). If the result of UL listening in an earlier subframe among the consecutive UL subframes indicates "busy" (LBT fails), the user terminal changes the listening conditions in the current UL subframe based on the listening conditions in the earlier UL subframe.

With reference to FIG. 8B, a specific example will be described in which listening conditions are changed when the result of UL listening in an earlier subframe indicates "busy." A plurality of UL subframes #N, N+1, N+2, N+3 and N+5 are scheduled in the UL for a user terminal, by the base station. UL subframes #N, N+1, N+2 and N+3 are consecutive subframes. Furthermore, in one UL grant, category 4 (#N), no LBT/category 2 (#N+1 and N+2) and category 4 (#N+5) are designated as listening conditions for each of UL subframes #N, N+1, N+2, N+3 and N+5.

Assume that, in the user terminal, the result of listening in first UL subframe #N indicates "busy." In this case, if the current UL subframe to apply LBT to is #N+1, given that the result of listening in previous UL subframe #N was "busy," the listening condition for current UL subframe #N+1 is changed from no LBT/category 2 to category 4 (MCOT=3 ms). That is, the listening conditions in a UL subframe (#N+1) before UL listening indicated the result of "busy" are used as the conditions of listening for the next UL subframe (#N+2). In this case, a configuration in which at least the same category continues being used as a listening condition may be adopted.

Note that, if the listening conditions for the current UL subframe are changed because the result of listening in the previous UL subframe indicated "busy," the rule of change can be configured on an arbitrary basis. For example, if the rules of change are provided in the standard, it is possible to adopt rules of change that are in conformity with the provision. Also, the rules of change may be reported from the base station to the user terminal in advance. To be more specific, if no LBT/category 2 is designated as a condition of listening in a UL grant, a change is made to category 4. The listening conditions after the change can be seen as listening conditions with a longer transmission defer period than the listening conditions before the change.

The above description relates to a method of changing UL listening conditions in the event consecutive UL subframes are scheduled, but the same method may be applied to UL listening for UL transmission in non-consecutive UL subframes.

For example, when non-consecutive UL subframes are scheduled and the result of listening in an earlier UL subframe indicates "busy," the listening conditions designated for the earlier UL subframe can continue being used in the current subframe. Alternatively, when non-consecutive UL subframes are scheduled and the result of listening in an earlier UL subframe indicates "idle," changes can be made from the listening conditions designated for the current subframe.

Now, an example of changing UL listening conditions when non-consecutive UL subframes are scheduled will be described below with reference to FIGS. 9A and 9B. Note that, FIGS. 9A and 9B assume cases where the channel occupancy time that is configured by DL listening by the radio base station and the channel occupancy time that is configured by UL listening by user terminals are shared between the radio base station and the user terminals.

First, with reference to FIG. 9A and FIG. 9B, problems that arise when using the listening conditions in the current subframe that have been designated earlier, without taking into consideration the result of listening in an earlier subframe, will be described in detail. FIG. 9A shows a state, in which listening conditions for a plurality of UL subframes that are configured to be at least partially non-consecutive, in one UL grant, are designated from a base station to a user terminal.

In the UL grant, category 4 is designated as a listening condition for UL subframes #N and #N+7, and category 2 (25 µs LBT) is designated as a listening condition for UL subframes #N−1, #N+2, #N+4, #N+6, #N+8 and #N+9.

In this case, the user terminal controls listening on the assumption that subframes #N to #N+6 are in the MCOT range. This is because the MCOT range is configured with four UL subframes (total 4 ms), in which UL transmission is carried out after category 4 UL listening is performed. That is, even for non-consecutive UL subframes, an MCOT range that takes into consideration the UL subframes to be actually transmitted is assumed. When MCOT is configured taking non-consecutive subframes into account, it is preferable to configure the MCOT range to be equal to or below a predetermined upper limit value.

In the situation where listening conditions are designated in this way, assume that the results of listening in UL subframes #N+2 and #N+4 show "busy," as shown in FIG. 9A. In this case, if the user terminal performs UL listening in subsequent UL subframe #N+7 based on category 4 reported in the UL grant, the opportunities for UL transmission may be reduced. This is because, although the MCOT range is modified due to the failure of UL listening, the user terminal still performs UL listening of category 4, which is based on more stringent conditions, within the modified MCOT range.

Therefore, according to the present embodiment, if UL listening fails (LBT busy) in a UL subframe, the listening conditions in subsequent UL subframes are changed in accordance with the change of MCOT. To be more specific, as shown in FIG. 9B, when the results of listening in UL subframes #N+2 and #N+4 indicate "busy," the user terminal controls the listening conditions in subsequent UL subframes on the assumption that the MCOT range is modified to last up to subframe #N+8.

Here, the user terminal changes the listening conditions for #N+7 included in the modified MCOT range from category 4 to category 2 (25 µs LBT). Also, the user terminal changes the listening conditions for UL subframe #N+9 outside the MCOT range from category 2 (25 µs LBT) to category 4. In this way, since a pre-designated listening condition is controlled to be modified (that is, the MCOT range is modified) based on the result of listening in UL subframes, it is possible to secure opportunities for UL transmission and perform UL transmission properly.

Second Embodiment

According to a second embodiment, a user terminal determines the timing of UL listening for the current UL subframe depending on the result of listening in an earlier UL subframe and/or the configuration of the PUSCH.

Figure 10A:
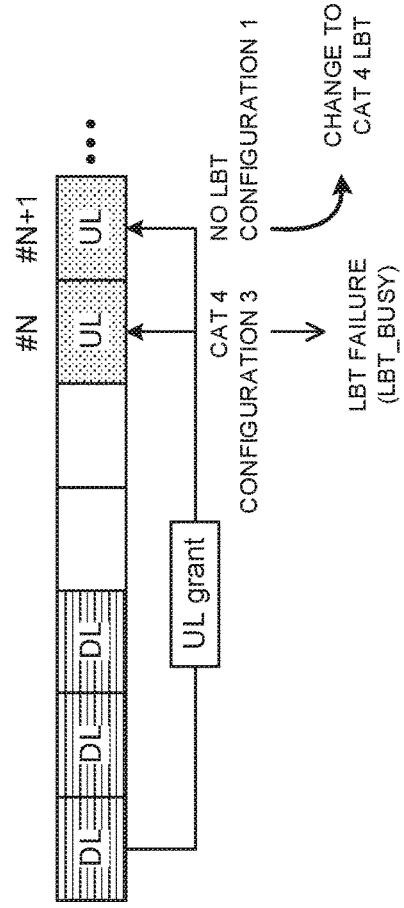
FIG. 10A and FIG. 10B are diagrams to show examples of operations for determining the timing of UL listening when LBT fails.
Figure 10B:
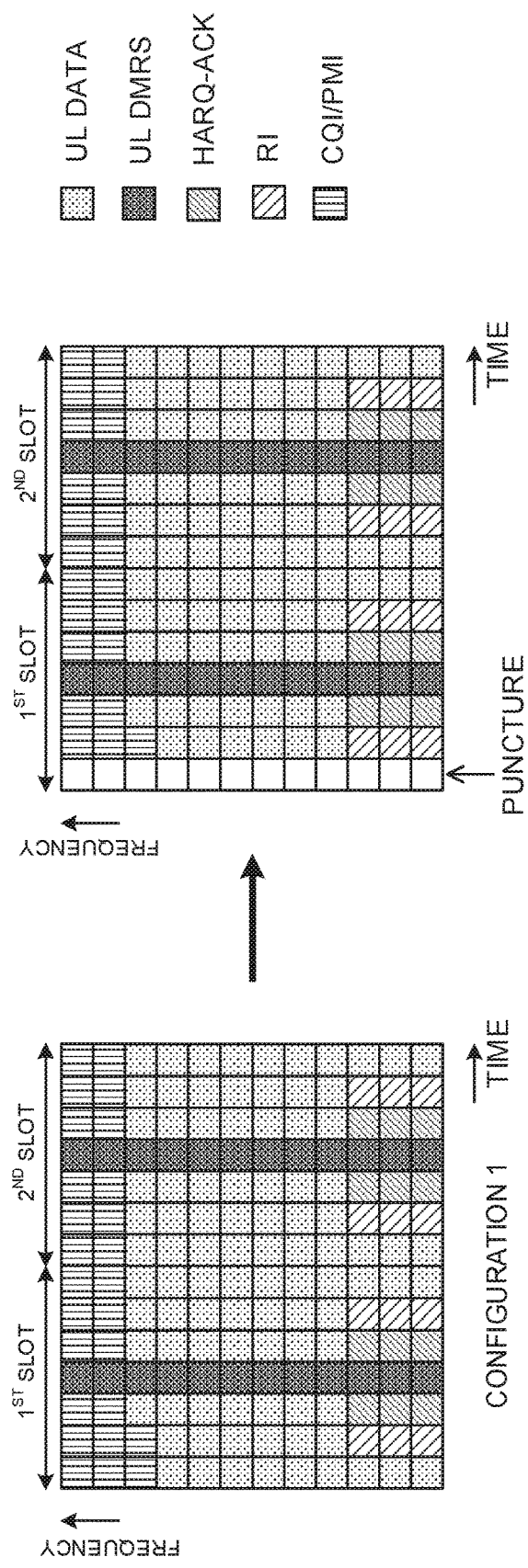

Now, with reference to FIG. 10A and FIG. 10B, how to determine the timing of UL listening in the current subframe when the result of listening in an earlier subframe indicates "busy" (LBT fails).

FIG. 10A shows a state in which listening conditions and PUSCH configurations are designated for UL subframes #N and #N+1 in a UL grant. In the UL grant, category 4 is designated as a listening condition for UL subframe #N, and PUSCH configuration 3 (FIG. 4C), in which the starting symbol is blank, is configured. "No LBT" is designated as a listening condition for UL subframe #N+1, and PUSCH configuration 1 (FIG. 4A) with no blank is configured. Given this situation, an example case is illustrated here in which the result of the UL listening of category 4 performed by the user terminal in UL subframe #N indicates "busy".

In this example, the result of listening in previous UL subframe #N indicates "busy," so that, in current UL subframe #N+1, the user terminal changes the listening condition (no LBT) that has been designate earlier, to category 4, which was applied to the listening in previous UL subframe #N. Also, the UL listening for UL transmission in UL subframe #N+1 can be implemented in the starting symbol of current UL subframe #N+1.

At this time, in current UL subframe #N+1, PUSCH configuration 1 (FIG. 4A), in which the starting symbol is not made blank, is configured. Therefore, as shown in FIG. 10B, the starting symbol in the resource block of PUSCH configuration 1 is punctured and made blank, and UL listening is executed in this blanked starting symbol.

By this means, even when the starting symbol in the current UL subframe structure is not made blank like in PUSCH configurations 1 and 2 shown in FIGS. 4A and 4B, listening can be performed in current UL subframe #N+1 by puncturing and making blank the starting symbol.

If the current UL subframe configuration is PUSCH configuration 1 or 2, in which the starting symbol is not blank, listening may be carried out using the last symbol of the resource block configured in previous UL subframe #N where the listening result was "busy."

Also, when the result of listening in previous UL subframe #N was "busy," if the PUSCH configuration in current UL subframe #N+1 is PUSCH configuration 3 or 4 (FIGS. 4C and 4D), in which the starting symbol is blank, UL listening is performed in the starting symbol of current UL subframe #N+1. If the PUSCH configuration in current UL subframe #N+1 is PUSCH configuration 3 or 4 (FIGS. 4C and 4D), listening can be executed without puncturing the starting symbol.

Figure 11A:
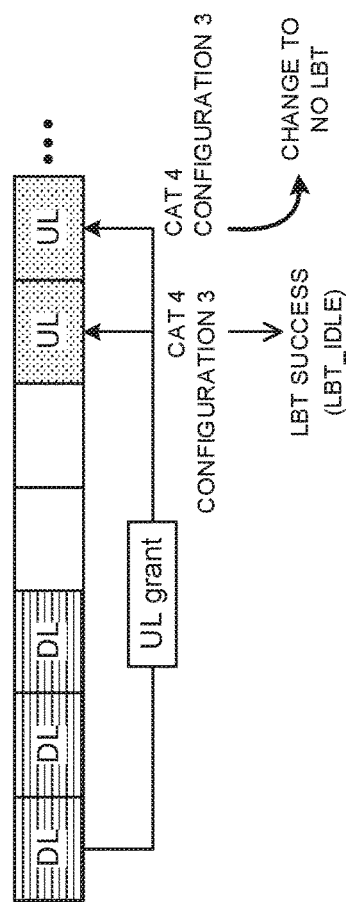
FIG. 11A and FIG. 11B are diagrams to show examples of operations for determining the timing of UL listening when LBT succeeds.
Figure 11B:
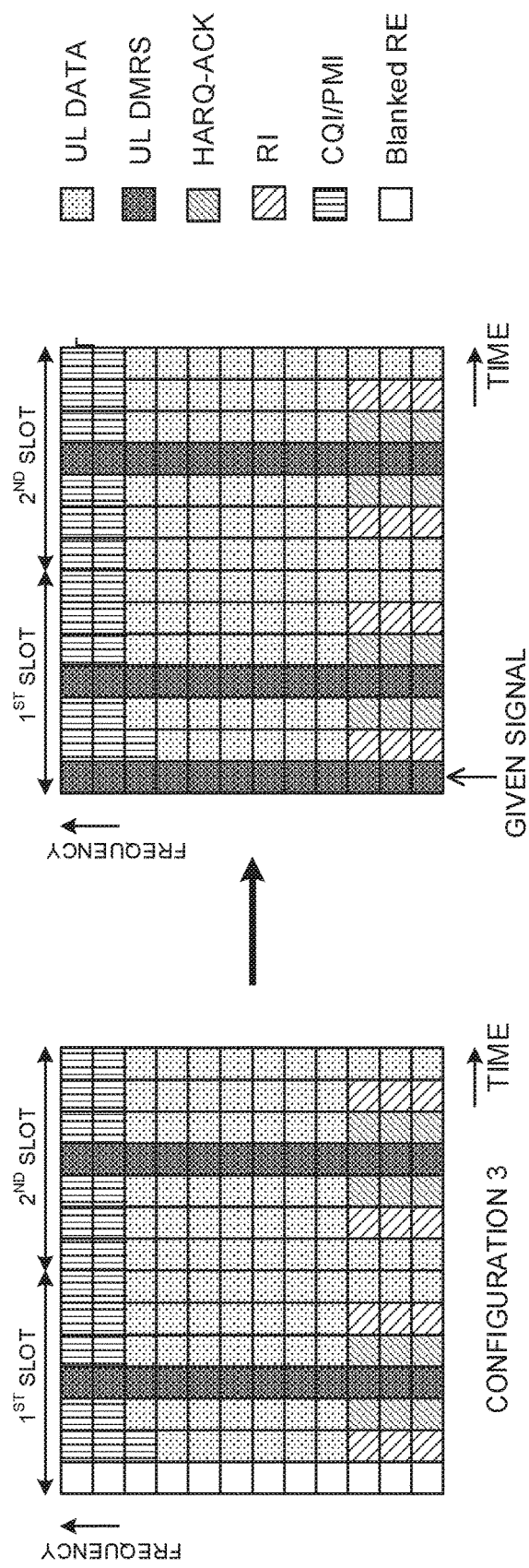

Now, with reference to FIG. 11A and FIG. 11B, how to determine the timing of UL listening in the current subframe when the result of listening in an earlier subframe indicates "idle" (LBT succeeds) will be described. FIG. 11A shows a state in which listening conditions and PUSCH configurations are designated for UL subframes #N and #N+1, in a UL grant.

Here, in the UL grant, category 4 is designated as a listening condition for UL subframes #N and #N+1 in common, and PUSCH configuration 3 (FIG. 4C), in which the starting symbol is made blank, is configured. Given this situation, an example case is illustrated here in which the result of the UL listening of category 4 performed by the user terminal in UL subframe #N indicates "idle."

With this example, a case is illustrated here in which the result of listening in previous UL subframe #N indicates "idle," and therefore the listening conditions for current UL subframe #N+1 are changed from the listening conditions (category 4) that have been designated earlier in a UL grant, to "no LBT."

Here, in current UL subframe #N+1, PUSCH configuration 3 (FIG. 4C), in which the starting symbol is blank, is configured. Therefore, if there is no transmission in the starting symbol, there is a possibility that opportunities for transmission are lost to other transmission points. So, as shown in FIG. 11B, a given UL signal (for example, UL DMRS) is transmitted in the blank starting symbol. The given signal to be transmitted in the starting symbol is not limited to the DMRS, and other UL signals may be used as well (for example, a reference signal).

In this way, the conditions of listening and/or the timing of listening are controlled based on the result of listening in an earlier UL subframe and/or the PUSCH configuration configured in a UL subframe, so that UL listening can be performed appropriately. As a result of this, it is possible to prevent degradation of communication quality in a communication system in which cells that are specified to employ listening are used, and/or maintain fairness with other systems and other operators.

Third Embodiment

A case will be described, with a third embodiment, in which a user terminal changes the listening conditions and/or the listening timing to apply to UL listening in subsequent subframes based on the result of listening for SRS transmission, instead of the listening result for PUSCH transmission.

Figure 12A:
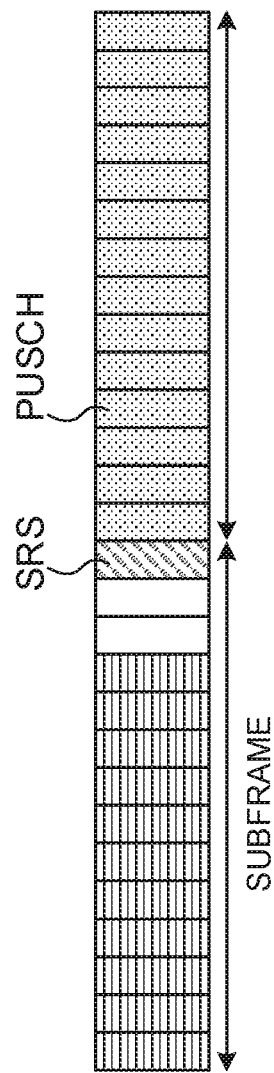
FIG. 12A and FIG. 12B are diagrams to show DL ending partial subframe in which an SRS is triggered, and UL subframes.
Figure 12B:
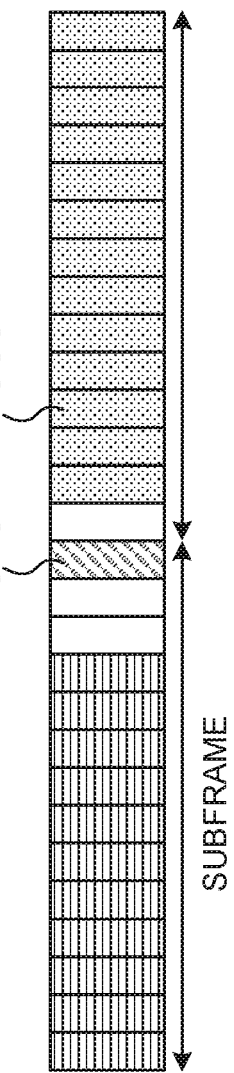

FIGS. 12A and 12B show cases where a DL subframe (DL ending partial subframe), in which no DL signal is allocated in the second half, and a UL subframe, are continuous. Also, cases are shown here in which an aperiodic SRS is allocated to the last symbol of the DL subframe. To be more specific, FIG. 12A corresponds to a case where configuration 1 (see FIG. 4A) is applied to the UL subframe, and FIG. 12B corresponds to a case where configuration 3 is applied to the UL subframe (see FIG. 4C). Note that, although FIGS. 12A and 12B show, as DL ending partial subframes, configurations in which no DL signal is not allocated to the last three symbols of a subframe, the configurations that can be applied are not limited to these.

Figure 13:
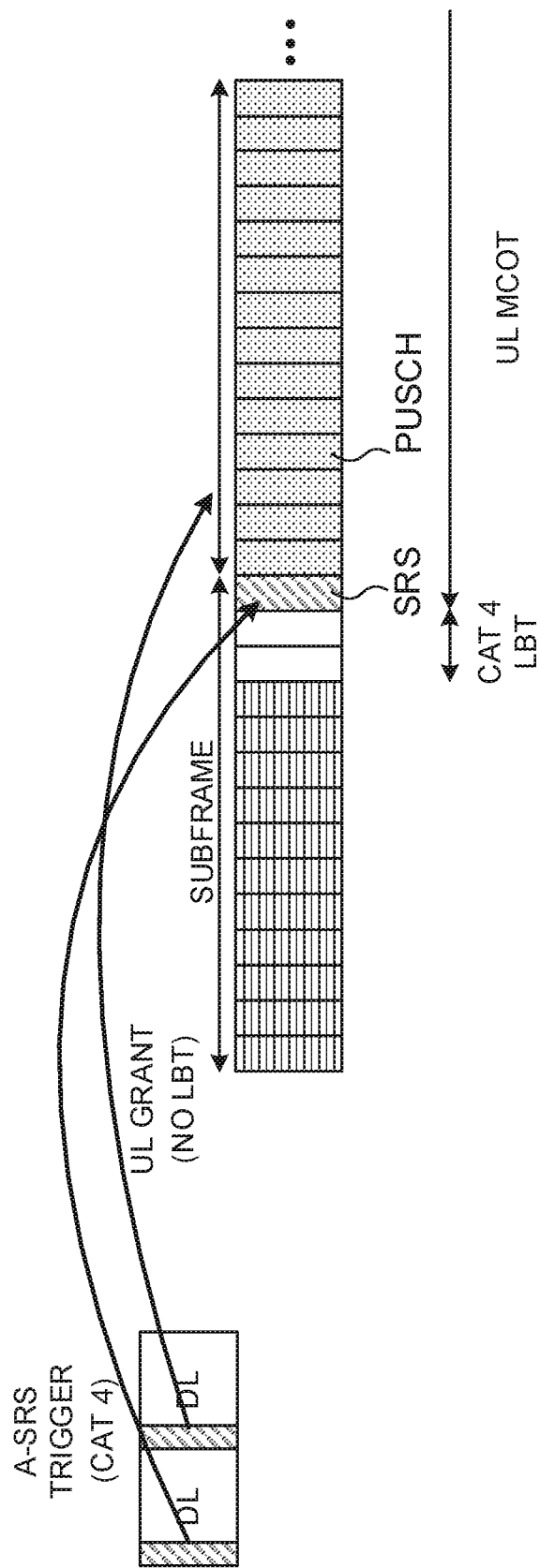
FIG. 13 is a conceptual diagram in which category 4 is designated as a condition of listening for SRS transmission.

When the configurations shown in FIGS. 12A and 12B are used, UL listening is performed before the aperiodic SRS is transmitted, and UL data (PUSCH) can be transmitted without performing UL listening for the UL data (see FIG. 13). FIG. 13 shows a case where the aperiodic SRS is triggered by downlink control information (for example, DL assignment) and the transmission of the PUSCH is commanded by another piece of downlink control information (for example, UL grant).

The radio base station can command UL listening of predetermined conditions (for example, category 4) to user terminals using the downlink control information that triggers the aperiodic SRS. In addition, the radio base station can command PUSCH transmission that does not require LBT by using the downlink control information that commands PUSCH transmission. By this means, PUSCH transmission can also be performed using UL listening for the aperiodic SRS (in the range of the UL listening MCOT).

However, in FIG. 13, when the result of listening that is performed before the aperiodic SRS is transmitted indicates "busy," the user terminal cannot transmit the aperiodic SRS in the last symbol of the DL subframe. Alternatively, if the user terminal is unable to detect aperiodic SRS-triggering downlink control information, the user terminal does not transmit the aperiodic SRS, and, furthermore, does not carry out UL listening before transmitting the aperiodic SRS.

In this case, if the user terminal transmits the PUSCH without applying UL listening based on downlink control information that commands transmission of the PUSCH, the PUSCH may collide with other UL transmissions. Also, if the PUSCH is transmitted without UL listening, fairness with other systems and so on cannot be guaranteed. Therefore, in FIG. 13, when the UL listening result for the SRS indicates "busy," or when the SRS-triggering downlink control information fails to be detected, how to control the transmission in the next UL subframe is the problem.

According to the present embodiment, if the result of UL listening that is performed before an aperiodic SRS is transmitted indicates "busy," or when the detection of SRS-triggering downlink control information fails, UL listening for UL data (for example, the PUSCH) is newly configured (see FIGS. 14A and 14B).

FIG. 14A shows a case where, when the result of UL listening that is performed before an aperiodic SRS is transmitted indicates "busy," UL listening is newly configured before the PUSCH is transmitted. For example, when the result of UL listening that is performed before an aperiodic SRS is transmitted indicates "busy," the user terminal performs (continues) UL listening by applying the UL listening conditions for the aperiodic SRS. In this case, the user terminal can perform UL listening using the last symbol of the DL subframe where the aperiodic SRS was scheduled to be transmitted. Alternatively, the user terminal may perform UL listening in or after the starting symbol of the UL subframe.

In this way, when the result of UL listening before an aperiodic SRS is transmitted indicates "busy," UL listening is performed, before the PUSCH is transmitted, based on the conditions of this UL listening, so that it is possible to prevent collisions with other UL transmissions and ensure fairness with other systems and so on. In addition, by applying the listening conditions for aperiodic SRS transmission, it is not necessary to report the listening conditions for PUSCH transmission to user terminals anew. When the result of UL listening before an aperiodic SRS is transmitted indicates "busy," a user terminal may apply predetermined UL listening conditions and/or timing that are configured in advance (default listening conditions and/or timing).

FIG. 14B shows a case where, when a user terminal fails to detect aperiodic SRS-triggering downlink control information, UL listening is newly configured before the PUSCH is transmitted. For example, when a command is given to the effect that UL listening is not to be applied to UL transmission in the UL subframe following a DL subframe in which no DL signal is allocated in the second half, if downlink control information that triggers an aperiodic SRS cannot be detected, the user terminal performs UL listening under predetermined conditions that are configured in advance.

According to the predetermined conditions, category 2 may be applied when the UL subframe is within the MCOT range (for example, DL MCOT), or UL listening can be performed by applying category 4 when the UL subframe is outside the MCOT range. Note that, when the UL subframe is within the MCOT range, UL transmission may be performed without performing UL listening.

In addition, the user terminal can perform UL listening at any timing in a symbol in a DL subframe in which no DL signal is transmitted (Alt. 1), in the last symbol in a DL subframe (Alt. 2), and/or in or after the starting symbol in a UL subframe (Alt. 3).

In this way, when a user terminal fails to detect aperiodic SRS-triggering downlink control information, the user terminal performs UL listening under predetermined conditions before transmitting the PUSCH, so that it is possible to prevent collisions with other UL transmissions and ensure fairness with other systems and so on. Also, by using predetermined UL listening conditions that are configured in advance, it is not necessary to report the listening conditions for PUSCH transmission to user terminals anew.

<Variations>

Note that the UL listening control shown in FIGS. 14A and 14B can also be applied to consecutive UL subframes. Example cases where UL listening is applied to consecutive UL subframes are shown in FIGS. 15A and 15B.

In FIG. 15A, if the result of UL listening that is performed before UL transmission in a UL subframe indicates "busy," a user terminal applies the conditions in this UL listening and continues UL listening. In this case, the user terminal can perform UL listening using the symbol where UL transmission was scheduled to be performed.

FIG. 15B shows a case where the user terminal fails to detect the downlink control information for triggering PUSCH transmission in a UL subframe, and newly performs UL listening before the PUSCH is transmitted in the next UL subframe. For example, when a command is given to the effect that UL listening is not to be applied to UL transmission in a UL subframe, if no downlink control information that commands UL listening before this UL transmission is detected, the user terminal performs UL listening under predetermined conditions that are configured in advance.

In addition, the user terminal can perform UL listening at any timing—in or after the starting symbol in the previous subframe (the subframe where the UL grant that failed to be detected was supposed to command transmission) of the UL subframe in which the UL transmission is performed (Alt. 1), in the last symbol in the previous subframe of the UL subframe in which the UL transmission is performed (Alt. 2), and/or in or after the starting symbol in the UL subframe in which the UL transmission is performed (Alt. 3).

In this way, control is exercised so that UL listening is performed when the result of UL listening that is performed before UL transmission in a UL subframe indicates "busy" or when the detection of downlink control information to trigger PUSCH transmission in a UL subframe fails, so that it is possible to prevent collisions with other UL transmissions and ensure fairness with other systems and so on.

(Radio Communication System)

Now, the structure of a radio communication system according to the present embodiment will be described below. In this radio communication system, each radio communication method according to the above-described embodiments is employed. Note that the radio communication method according to each embodiment may be used alone or may be used in combination.

Figure 16:
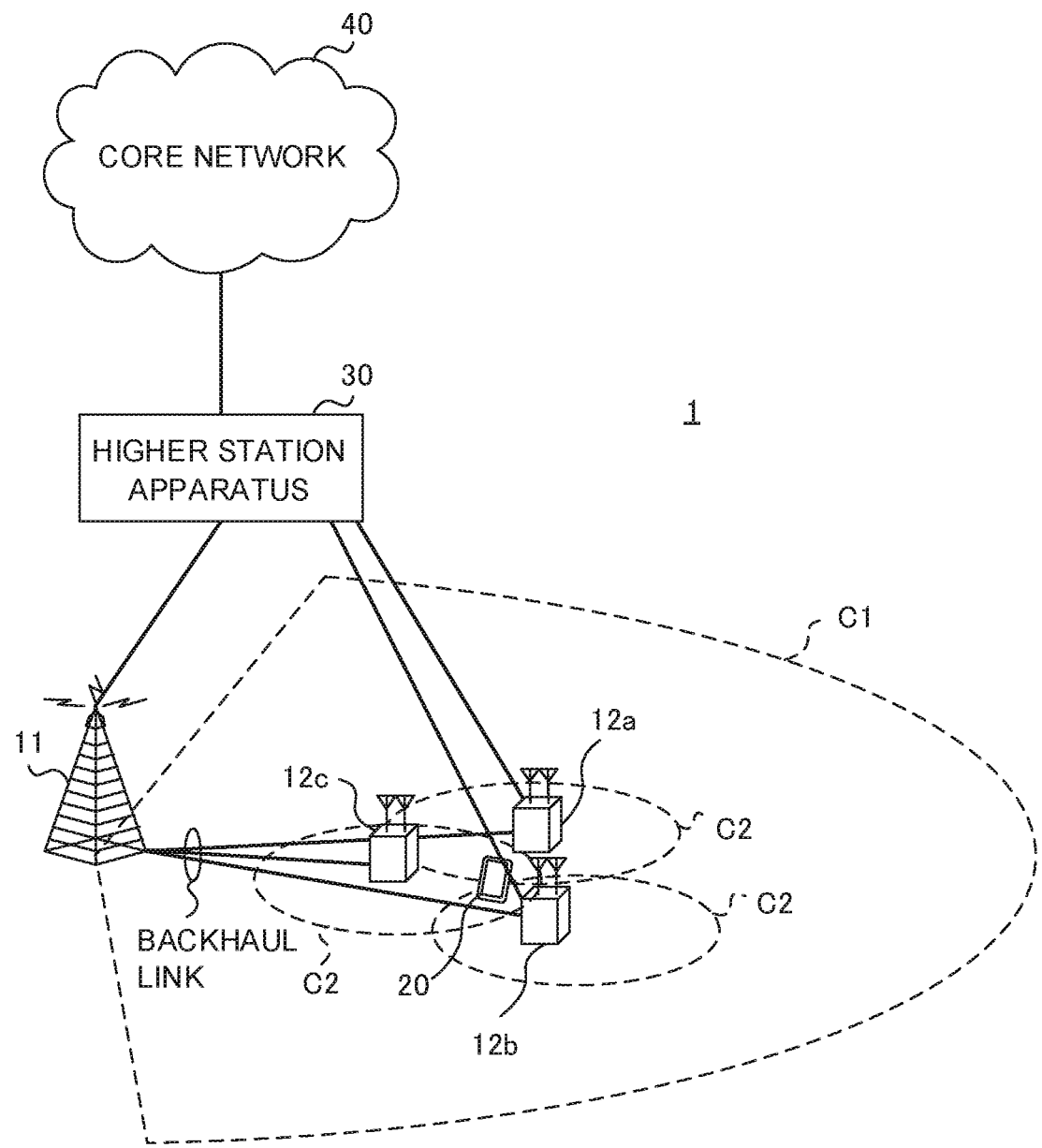
FIG. 16 is a diagram to show an example of a schematic structure of a radio communication system according to the present embodiment.

FIG. 16 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A" (LTE-Advanced), "IMT-Advanced," "4G," "5G," "FRA" (Future Radio Access), "NR" (New Rat) and so on.

The radio communication system 1 shown in FIG. 16 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A configuration in which different numerologies are applied between cells may be adopted. Note that "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells. Note that it is possible to adopt a configuration including a TDD carrier, in which shortened TTIs are applied to some of a plurality of cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the configuration of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink (DL), and SC-FDMA (Single-Carrier Frequency Division Multiple Access) is applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

In the radio communication system 1, a DL data channel (PDSCH: Physical Downlink Shared Channel), which is also referred to as "DL shared channel" and so on), which is used by each user terminal 20 on a shared basis, a broadcast channel (PBCH: Physical Broadcast CHannel), L1/L2 control channels and so on are used as DL channels. User data, higher layer control information, SIBs (System Information Blocks) and so on are communicated in the PDSCH. Also, the MIB (Master Information Block) is communicated in the PBCH.

The L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement signals (ACK/NACK) in response to the PUSCH are communicated by the PHICH. The EPDCCH is frequency-division-multiplexed with the PDSCH (downlink shared data channel) and used to communicate DCI and so on, like the PDCCH.

In the radio communication system 1, a UL data channel (PUSCH: Physical Uplink Shared CHannel, which is also referred to as "UL shared channel" and so on), which is used by each user terminal 20 on a shared basis, a UL control channel (PUCCH: Physical Uplink Control CHannel), a random access channel (PRACH: Physical Random Access CHannel) and so on are used as UL channels. User data, higher layer control information and so on are communicated by the PUSCH. Uplink control information (UCI), including at least one of acknowledgment information (ACK/NACK) and channel quality information (CQI), is communicated via the PUSCH or the PUCCH. By means of the PRACH, random access preambles for establishing connections with cells are communicated.

<Radio Base Station>

Figure 17:
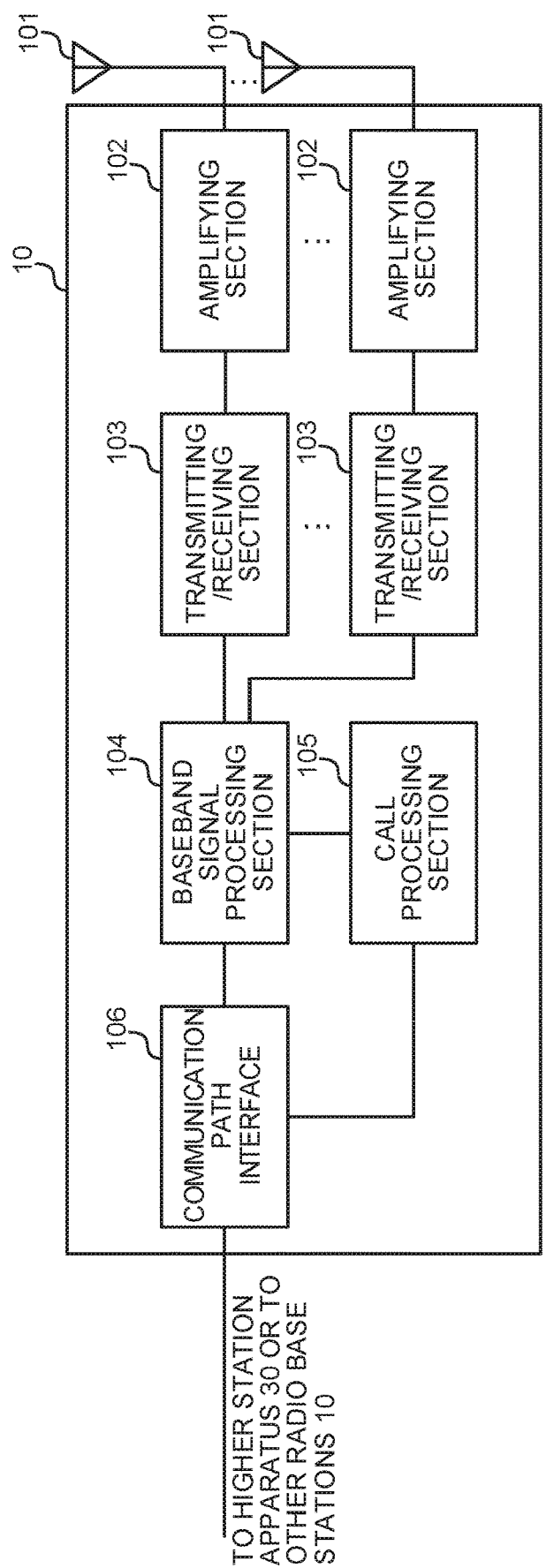
FIG. 17 is a diagram to show an example of a functional structure of a radio base station according to the present embodiment.

FIG. 17 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

DL data to be transmitted from the radio base station 10 to a user terminal 20 is input from the higher station apparatus 30 to the baseband signal processing section 104, via the communication path interface 106.

In the baseband signal processing section 104, the DL data is subjected to transmission processes, including a PDCP (Packet Data Convergence Protocol) layer process, division and coupling of user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, DL control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (for example, an interface in compliance with the CPRI (Common Public Radio Interface), such as optical fiber, the X2 interface, etc.).

Note that the transmitting/receiving sections 103 transmit DL signals (for example, a DL control signal (DL control channel), a DL data signal (DL data channel, DL shared channel and so on), a DL reference signal (DM-RS, CSI-RS and so on), a discovery signal, a synchronization signal, a broadcast signal and so on), and receive UL signals (for example, a UL control signal (UL control channel), a UL data signal (UL data channel, UL shared channel and so on), a UL reference signal and so on).

To be more specific, the transmitting/receiving sections 103 transmit downlink control information (for example, UL grant, DL assignment, etc.) to the user terminals 20. For example, from the transmitting/receiving sections 103, information about UL listening conditions to be commonly applied to a plurality of UL subframes is included in the downlink control information and transmitted. Alternately, the transmitting/receiving sections 103 include information about the conditions of UL listening to apply to each of a plurality of UL subframes in the downlink control information, and transmit the downlink control information.

In addition, the transmitting/receiving sections 103 transmit information about the uplink shared channel configuration to be applied in each of a plurality of UL subframes. In addition, the transmitting/receiving sections 103 transmit downlink control information that commands triggering an aperiodic SRS, which is allocated to the last symbol of DL subframes.

The transmission section and the receiving section of the present invention are comprised of a transmitting/receiving section 103 and/or a communication path interface 106.

Figure 18:
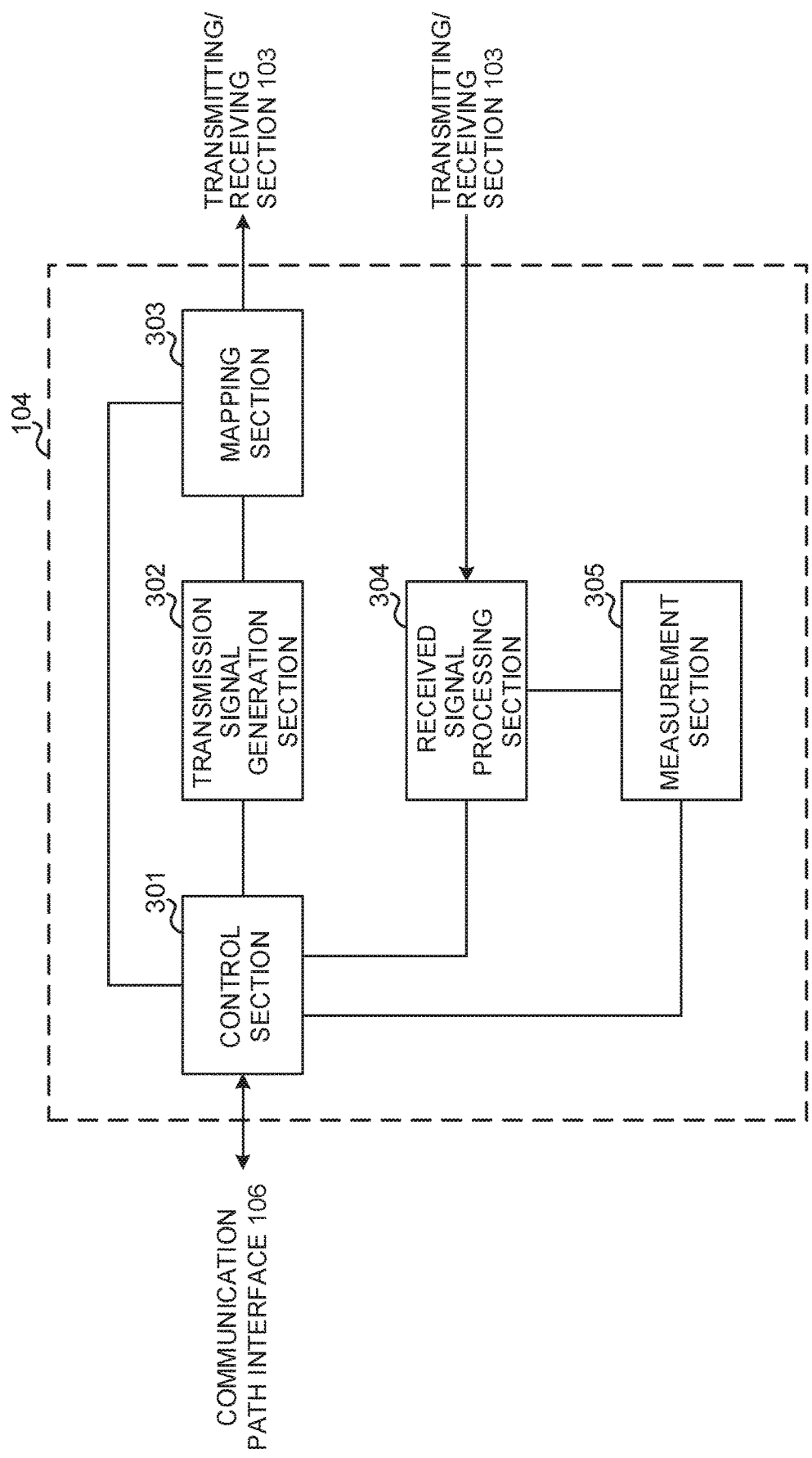
FIG. 18 is a diagram to show an example of a functional structure of a baseband signal processing section in a radio base station.

FIG. 18 is a diagram to show an example of a functional structure of a radio base station according to the present embodiment. Note that, although FIG. 18 primarily shows functional blocks that pertain to characteristic parts of the present embodiment, a radio base station 10 has other functional blocks that are necessary for radio communication as well. As shown in FIG. 18, the baseband signal processing section 104 has a control section 301, a transmission signal generation section 302, a mapping section 303, a received signal processing section 304 and a measurement section 305.

The control section 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of DL signals and/or UL signals. To be more specific, the control section 301 controls the transmission signal generation section 302, the mapping section 303 and the transmitting/receiving sections 103 to generate and transmit DCI (DL assignment) that includes DL data channel scheduling information and DCI (UL grant) that includes UL data channel scheduling information.

In addition, the control section 301 controls the UL listening conditions to apply to UL transmission in a plurality of UL subframes that are scheduled for UL transmission according to the downlink control information.

The transmission signal generation section 302 generates DL signals (DL control channel, DL data channel, DL reference signals such as DM-RS, and so on) based on commands from the control section 301 and outputs the DL signals to the mapping section 303. The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals that are transmitted from the user terminals 20 (UL control channel, UL data channel, UL reference signals, and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, the received signal processing section 304 outputs at least one of a preamble, control information and UL data to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

Also, by using the received signals, the received signal processing section 304 may measure the received power (for example, RSRP (Reference Signal Received Power)), the received quality (for example, RSRQ (Reference Signal Received Quality)), channel states and so on. The measurement results may be output to the control section 301.

<User Terminal>

Figure 19:
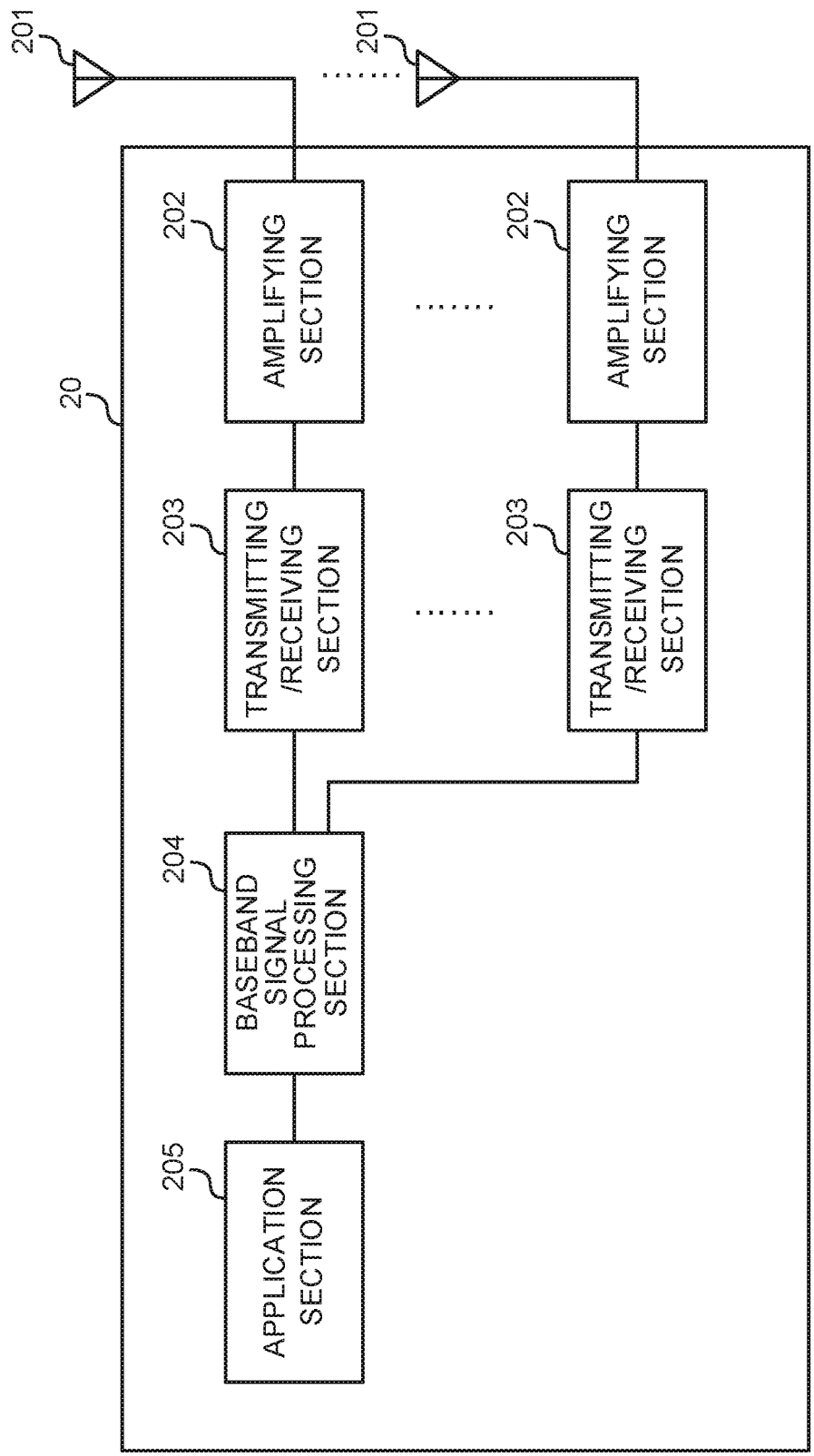
FIG. 19 is a diagram to show an example of a functional structure of a user terminal according to the present embodiment.

FIG. 19 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process and so on. DL data is forwarded to the application section 205. The application section 205 performs processes related to higher layers above the physical layer and the MAC layer and so on. Also, in the DL data, the system information and the higher layer control information are also forwarded to the application section 205.

Meanwhile, UL data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 transmit DL signals (for example, a DL control signal (DL control channel), a DL data signal (DL data channel, DL shared channel and so on), a DL reference signal (DM-RS, CSI-RS and so on), a discovery signal, a synchronization signal, a broadcast signal and so on), and receive UL signals (for example, a UL control signal (UL control channel), a UL data signal (UL data channel, UL shared channel and so on), a UL reference signal and so on).

To be more specific, the transmitting/receiving sections 203 receive downlink control information (for example, UL grant, DL assignment, etc.), and, furthermore, transmit UL signals. For example, the transmitting/receiving sections 203 receive, in the downlink control information, information about the UL listening conditions to be commonly applied to a plurality of UL subframes. Alternately, the transmitting/receiving sections 203 receive, in the downlink control information, information about the UL listening conditions to be applied individually to each of a plurality of UL subframes.

In addition, the transmitting/receiving sections 203 receive information about the uplink shared channel configuration to be adopted in each of a plurality of UL subframes. Also, the transmitting/receiving sections 203 receive downlink control information that commands triggering an aperiodic SRS, which is allocated to the last symbol of DL subframes.

Figure 20:
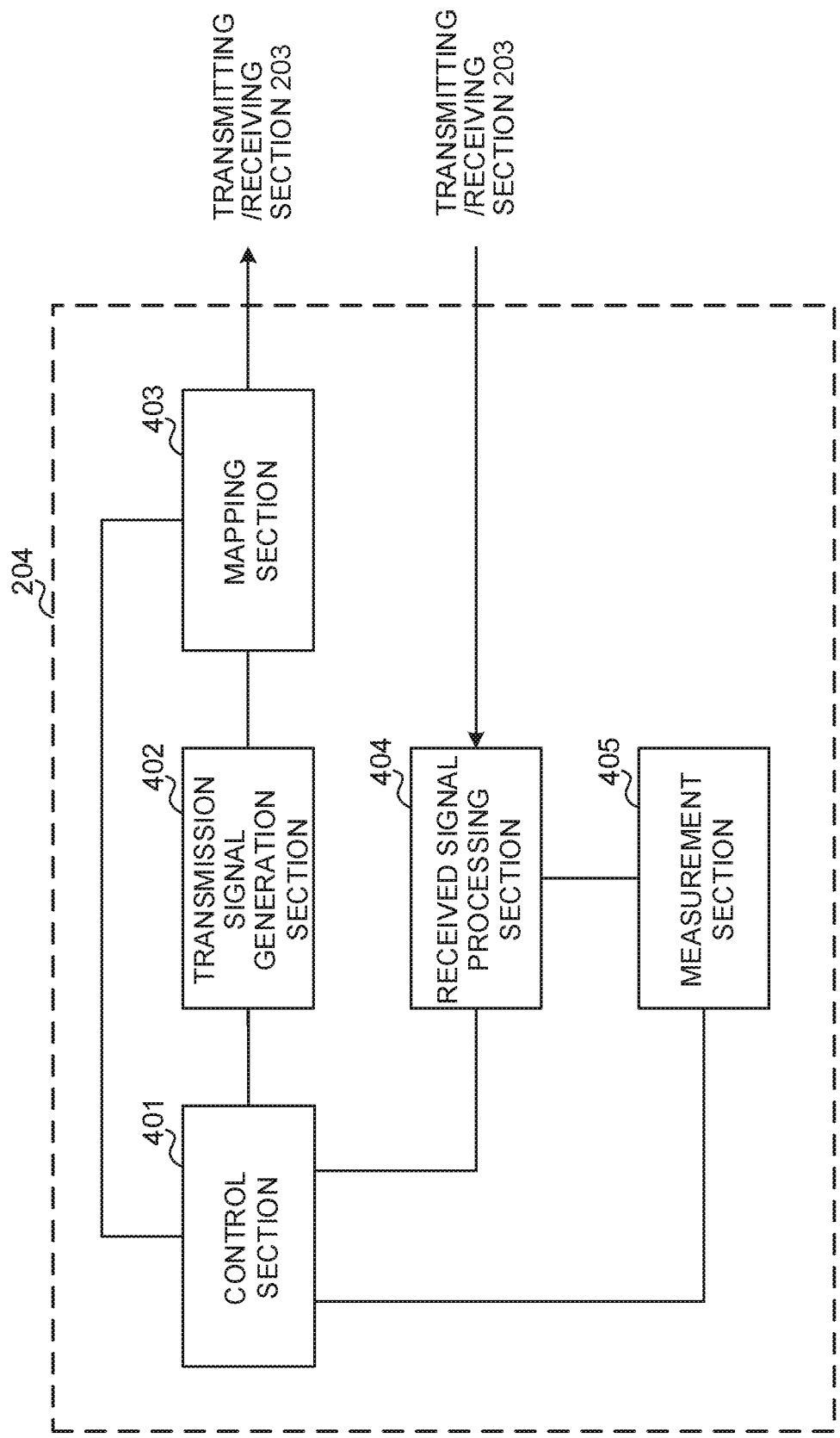
FIG. 20 is a diagram to show an example of a functional structure of a baseband signal processing section in a user terminal.

FIG. 20 is a diagram to show an example of a functional structure of a user terminal according to the present embodiment. Note that, although FIG. 20 primarily shows functional blocks that pertain to characteristic parts of the present embodiment, the user terminal 20 has other functional blocks that are necessary for radio communication as well. As shown in FIG. 20, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 controls UL transmission based on the result of UL listening that is performed before UL transmission. For example, the control section 401 controls the conditions and/or timing of UL listening for UL transmission in a predetermined UL subframe based on the result of UL listening for UL transmission in the previous UL subframe of the predetermined UL subframe (see FIGS. 8A and 8B).

To be more specific, when the result of UL listening for UL transmission in the previous UL subframe of the predetermined UL subframe indicates "idle," the control section 401 changes the UL listening conditions for the UL transmission in the predetermined UL subframe (see FIG. 8A). Alternatively, if the result of UL listening for UL transmission in the previous UL subframe of the predetermined UL subframe indicates "busy," the control section 401 applies the UL listening conditions adopted in the previous UL subframe of the predetermined UL subframe, or predetermined UL listening conditions that are configured in advance, to the UL transmission in the predetermined UL subframe (see FIG. 8B).

In addition, the control section 401 determines the timing of UL listening for the UL transmission in the predetermined UL subframe, based on the uplink shared channel configuration to be adopted in the predetermined UL subframe and the UL listening result for UL transmission in the previous UL subframe of the predetermined UL subframe (see FIGS. 10A and 10B and FIGS. 11A and 11B).

Also, when the result of UL listening performed before an aperiodic SRS is transmitted indicates "busy" and the UL subframe is configured following a DL subframe, the control section 401 performs UL listening for UL transmission in the UL subframe in the last symbol of the DL subframe (see FIGS. 14A and 14B).

The transmission signal generation section 402 generates UL signals (UL control channel, UL data channel, UL reference signals and so on) based on commands from the control section 401, and outputs the UL signals to the mapping section 403. The transmission signal generation section 402 can be constituted by a signal generator, a signal generating circuit or signal generating apparatus that can be described based on general understanding of the technical field to which the present invention pertains.

Also, the transmission signal generation section 402 generates the UL data channel based on commands from the control section 401. For example, when a UL grant is included in a DL control channel that is reported from the radio base station 10, the control section 401 commands the transmission signal generation section 402 to generate the UL data channel.

The mapping section 403 maps the UL signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signal include, for example, DL signals transmitted from the radio base station 10 (DL control channel, DL data channel, DL reference signals and so on). The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from control section 401, the received signal processing section 404 performs blind decoding of the DL control channel, which schedules transmission and/or reception of the DL data channel, and performs the receiving process of the DL data channel based on this DCI. In addition, the received signal processing section 404 estimates channel gain based on the DM-RS or the CRS, and demodulates the DL data channel based on the estimated channel gain.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the DL received quality (for example, RSRQ), the channel states and so on of the received signals. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 21:
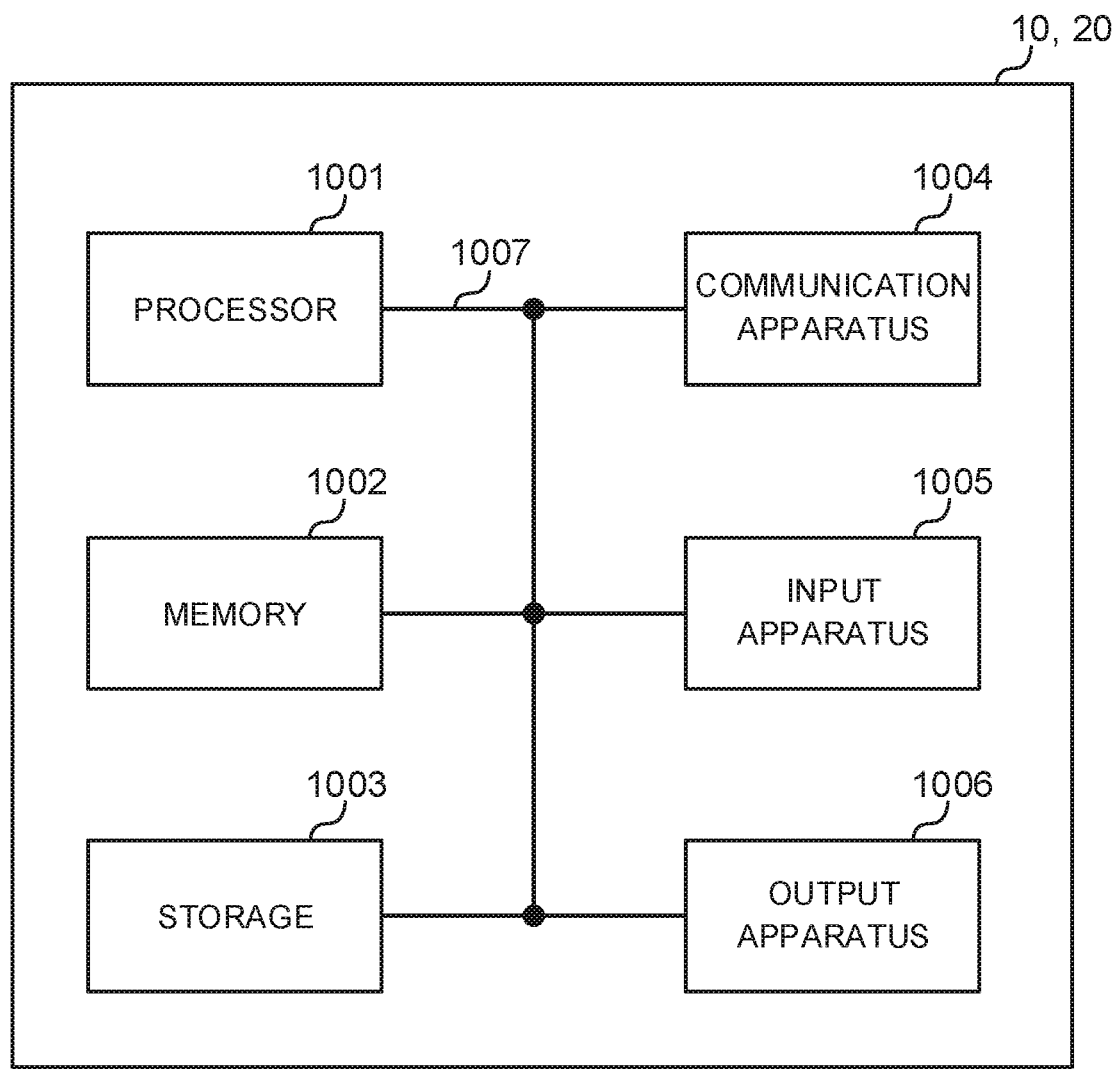
FIG. 21 is a diagram to show an example hardware structure of a radio base station and a user terminal according to one embodiment of the present invention.

That is, the radio base stations, user terminals and so according to the embodiments of the present invention may function as a computer that executes the processes of the radio communication method of the present invention. FIG. 21 is a diagram to show an example hardware structure of a radio base station and a user terminal according to an embodiment of the present invention. Physically, a radio base station 10 and a user terminal 20, which have been described, may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) or the like. The memory 1002 can store executable programs (program codes), software modules, and the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD: Frequency Division Duplex) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one piece of these hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Further, a radio frame may be comprised of one or more periods (frames) in the time domain. Each of one or more periods (frames) constituting a radio frame may be referred to as a "subframe." Further, a subframe may be comprised of one or more slots in the time domain. Further, a slot may be comprised of one or more symbols (OFDM (Orthogonal Frequency Division Multiplexing) symbols, SC-FDMA (Single Carrier Frequency Division Multiple Access) symbols, and so on) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval" (TTI), or a plurality of consecutive subframes may be referred to as a "TTI," or one slot may be referred to as a "TTI." That is, a subframe and a TTI may be a subframe (one ms) in existing LTE, may be a shorter period than one ms (for example, one to thirteen symbols), or may be a longer period of time than one ms.

Here, a TTI refers to the minimum time unit of scheduling in wireless communication, for example. For example, in LTE systems, a radio base station schedules the radio resources (such as the frequency bandwidth and transmission power that can be used in each user terminal) to allocate to each user terminal in TTI units. The definition of TTIs is not limited to this. The TTI may be the transmission time unit of channel-encoded data packets (transport blocks), or may be the unit of processing in scheduling, link adaptation and so on.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is a resource allocation unit in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block" (PRB: Physical RB), a "PRB pair," an "RB pair" and so on.

Further, a resource block may be comprised of one or more resource elements (REs). For example, one RE may be a radio resource field of one subcarrier and one symbol.

Note that the structures of radio frames, subframes, slots, symbols and the like described above are merely examples. For example, configurations pertaining to the number of subframes included in a radio frame, the number of slots included in a subframe, the number of symbols and RBs included in a slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Information, signals and so on can be output from higher layers to lower layers and/or from lower layers to higher layers. Information, signals and so on may be input and output via a plurality of network nodes.

The information, signals and so on that are input and/or output may be stored in a specific place (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and signals and/or combinations of these.

Physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be called a "fixed station," "NodeB," "eNodeB (eNB)," "access point," "transmission point," "receiving point," "femto cell," "small cell" and/or other names.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Further, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network consisting of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The invention claimed is:

1. A terminal comprising:
a receiver that receives first downlink control information (DCI) indicating SRS transmission and second DCI indicating a listening condition for PUSCH transmission; and
a processor that, when contiguous transmissions of the SRS transmission and the PUSCH transmission are scheduled, changes the listening condition for following PUSCH transmission based on a listening result for the SRS transmission.

2. The terminal according to claim 1, wherein, when the listening result for the SRS transmission is idle, the processor changes the listening condition for the following PUSCH transmission to the listening condition for PUSCH transmission without UL listening.

3. A base station comprising:
a transmitter that transmits first downlink control information (DCI) indicating SRS transmission and second DCI indicating a listening condition for PUSCH transmission; and
a processor that, when contiguous transmissions of the SRS transmission and the PUSCH transmission are scheduled, controls the listening condition in the terminal so as to change the listening condition for following PUSCH transmission based on a listening result obtained from the listening condition for the SRS transmission in the terminal.

4. A radio communication method for a terminal, comprising:
receiving first downlink control information (DCI) indicating SRS transmission and second DCI indicating a listening condition for PUSCH transmission; and
when contiguous transmissions of the SRS transmission and the PUSCH transmission are scheduled, changing a listening condition for following PUSCH transmission based on a listening result for the SRS transmission.

5. A system comprising: a terminal; and a base station, the terminal comprising:
a receiver that receives first downlink control information (DCI) indicating SRS transmission and second DCI indicating a listening condition for PUSCH transmission; and
a processor that, when contiguous transmissions of the SRS transmission and the PUSCH transmission are scheduled, changes a listening condition for following PUSCH transmission based on a listening result for the SRS transmission, and
the base station comprising:
a transmitter that transmits the first DCI and the second DCI; and
a processor that, when the contiguous transmissions of the SRS transmission and the PUSCH transmission are scheduled, controls the listening condition in the terminal so as to change the listening condition for the following PUSCH transmission based on the listening result obtained from the listening condition for the SRS transmission in the terminal.

* * * * *